United States Patent
Buerkle et al.

(10) Patent No.: US 12,228,939 B2
(45) Date of Patent: Feb. 18, 2025

(54) OCCUPANCY VERIFICATION DEVICE AND METHOD

(71) Applicant: Intel Corporation, Santa Clara, CA (US)

(72) Inventors: Cornelius Buerkle, Karlsruhe (DE); Fabian Oboril, Karlsruhe (DE)

(73) Assignee: Intel Corporation, Santa Clara, CA (US)

( * ) Notice: Subject to any disclaimer, the term of this patent is extended or adjusted under 35 U.S.C. 154(b) by 838 days.

(21) Appl. No.: 16/912,758

(22) Filed: Jun. 26, 2020

(65) Prior Publication Data

US 2020/0326721 A1  Oct. 15, 2020

(51) Int. Cl.
  *G06V 20/00* (2022.01)
  *B60W 60/00* (2020.01)
  (Continued)

(52) U.S. Cl.
  CPC ....... *G05D 1/0253* (2013.01); *B60W 60/0016* (2020.02); *G05D 1/0217* (2013.01);
  (Continued)

(58) Field of Classification Search
  CPC ............. G05D 1/0253; G05D 1/0217; G05D 2201/0212; B60W 60/0016;
  (Continued)

(56) References Cited

U.S. PATENT DOCUMENTS

| | | | |
|---|---|---|---|
| 8,645,480 B1 * | 2/2014 | Emigh | G01C 21/3697 |
| | | | 709/206 |
| 10,611,371 B2 * | 4/2020 | Kusano | B60W 60/00274 |

(Continued)

FOREIGN PATENT DOCUMENTS

| | | | | |
|---|---|---|---|---|
| CN | 108431549 A | * | 8/2018 | ............ B60W 10/04 |
| EP | 3690753 A1 | * | 8/2020 | ............ G01S 13/931 |
| WO | 2018118071 A1 | | 6/2018 | |

OTHER PUBLICATIONS

DeepLearningBasedVideoSystemForAccurateAndRealTimeParkingMeasurement.pdf (Year: 2019).*

(Continued)

*Primary Examiner* — Jonathan L Sample
*Assistant Examiner* — Shaheda Hoque
(74) *Attorney, Agent, or Firm* — Viering, Jentschura & Partner mbB

(57) ABSTRACT

An occupancy verification including one or more processors, configured to receive occupancy grid data representing a plurality of cells of an occupancy grid and for each cell of the plurality of cells, a probability of whether the cell is occupied; receive object location data, representing one or more locations of one or more objects identified using a model; map the object location data to one or more cells of the plurality of cells based on the one or more locations of the one or more objects; determine comparison grid data, representing the plurality of cells of the occupancy grid and for each cell of the plurality of cells, a probability of whether the cell is occupied based on whether the object location data are mapped to the cell; and compare the occupancy grid data to the comparison grid data using at least one comparing rule.

13 Claims, 17 Drawing Sheets

1602

(51) Int. Cl.
  *G05D 1/00* (2006.01)
  *G06T 7/70* (2017.01)
  *G06V 20/56* (2022.01)

(52) U.S. Cl.
  CPC ............... *G06T 7/70* (2017.01); *G06V 20/56* (2022.01); *G06T 2207/20084* (2013.01); *G06T 2207/30252* (2013.01)

(58) Field of Classification Search
  CPC ................ B60W 60/0015; G06T 7/70; G06T 2207/20084; G06T 2207/30252; G06T 2207/30168; G06T 7/0002; G06V 20/56; G06V 20/58; G06N 20/00; G06N 3/04; G06F 18/22
  See application file for complete search history.

(56) References Cited

U.S. PATENT DOCUMENTS

| | | | |
|---|---|---|---|
| 11,016,491 B1* | 5/2021 | Millard | G06N 3/045 |
| 11,093,759 B2* | 8/2021 | Doria | G06V 20/56 |
| 11,126,180 B1* | 9/2021 | Kobilarov | B60W 30/095 |
| 11,170,299 B2* | 11/2021 | Kwon | G06V 20/56 |
| 11,340,079 B1* | 5/2022 | Ebrahimi Afrouzi | G06T 7/70 |
| 11,403,853 B2* | 8/2022 | Murveit | G06F 18/2155 |
| 11,409,841 B2* | 8/2022 | Steyer | G06F 17/18 |
| 11,427,210 B2* | 8/2022 | Rosman | G06N 3/045 |
| 11,435,946 B2* | 9/2022 | Bielby | G06F 3/0673 |
| 11,501,105 B2* | 11/2022 | Kangaspunta | G06F 16/29 |
| 11,554,795 B2* | 1/2023 | Roskopf | G06V 20/56 |
| 11,577,722 B1* | 2/2023 | Packer | G06V 10/82 |
| 11,592,818 B2* | 2/2023 | Tariq | G06N 20/00 |
| 11,630,210 B2* | 4/2023 | Lin | G01C 21/005 356/4.01 |
| 11,634,162 B2* | 4/2023 | Haynes | B60W 60/00272 701/27 |
| 11,636,307 B2* | 4/2023 | Urtasun | G08G 1/0112 701/25 |
| 11,648,945 B2* | 5/2023 | Sajjadi Mohammadabadi | B60W 30/09 382/104 |
| 11,691,650 B2* | 7/2023 | Li | B60W 60/00272 706/15 |
| 11,726,492 B2* | 8/2023 | Philbin | B60W 60/00276 701/27 |
| 11,727,690 B2* | 8/2023 | Bansal | G06V 10/764 701/45 |
| 11,804,050 B1* | 10/2023 | Milletari | G06N 3/063 |
| 11,900,797 B2* | 2/2024 | Ramamoorthy | B60W 60/0015 |
| 11,950,166 B2* | 4/2024 | Refaat | G06N 3/084 |
| 11,994,866 B2* | 5/2024 | Philbin | G01S 13/931 |
| 2015/0073707 A1 | 3/2015 | Ma et al. | |
| 2018/0188040 A1* | 7/2018 | Chen | G06T 7/248 |
| 2018/0188043 A1* | 7/2018 | Chen | G05D 1/0246 |
| 2018/0218226 A1* | 8/2018 | Wellington | G06V 20/56 |
| 2018/0300561 A1 | 10/2018 | Steyer et al. | |
| 2019/0047439 A1 | 2/2019 | Natroshvili et al. | |
| 2019/0072965 A1* | 3/2019 | Zhang | G08G 1/161 |
| 2019/0197029 A1 | 6/2019 | Gonzalez Aguirre et al. | |
| 2019/0226854 A1 | 7/2019 | Geissler et al. | |
| 2019/0258251 A1* | 8/2019 | Ditty | G06N 3/063 |
| 2019/0272446 A1* | 9/2019 | Kangaspunta | G01C 21/3859 |
| 2019/0279049 A1* | 9/2019 | Doria | G06V 20/653 |
| 2019/0384309 A1* | 12/2019 | Silva | G01S 17/931 |
| 2019/0391578 A1* | 12/2019 | Tariq | G06N 3/08 |
| 2020/0103523 A1* | 4/2020 | Liu | G01S 13/865 |
| 2020/0148215 A1* | 5/2020 | Mohajerin | G06N 3/045 |
| 2020/0183011 A1* | 6/2020 | Lin | G01S 17/04 |
| 2020/0192391 A1* | 6/2020 | Vora | G05D 1/0221 |
| 2020/0219264 A1* | 7/2020 | Brunner | G01S 7/4808 |
| 2020/0257931 A1* | 8/2020 | Yershov | B60W 60/0011 |
| 2020/0276988 A1* | 9/2020 | Graves | B60W 60/0016 |
| 2020/0278681 A1* | 9/2020 | Gier | G05D 1/0246 |
| 2020/0284590 A1* | 9/2020 | Chen | G01C 21/3841 |
| 2020/0293796 A1* | 9/2020 | Sajjadi Mohammadabadi | G06V 10/751 |
| 2021/0004012 A1* | 1/2021 | Marchetti-Bowick | B60W 30/18154 |
| 2021/0101624 A1* | 4/2021 | Philbin | G06F 18/251 |
| 2021/0276598 A1* | 9/2021 | Amirloo Abolfathi | B60W 60/00272 |
| 2021/0300424 A1* | 9/2021 | McGill | G05B 13/027 |
| 2021/0347382 A1* | 11/2021 | Huang | G01S 19/393 |

OTHER PUBLICATIONS

Deep Learning-Based Video System for Accurate and Real-Time Parking Measurement Mar. 4, 2019 | Bill Yang Cai et al. | IEEE Internet of Things Journal (vol. 6, Issue: 5, pp. 7693-7701) (Year: 2019).*

European Search Report issued for the European Patent Application No. 20207113.0, dated Mar. 30, 2021 (for Informational purposes only).

Nuss et al., A random finite set approach for Dynamic Occupancy Grid Maps with Real-Time Application,The International Journal of Robotics Research, Jul. 2018, 20 pages, vol. 37, issue 8, SAGE journals.

Steyer et al., Grid-Based Environment Estimation Using Evidential Mapping and Particle Tracking, IEEE Transactions On Intelligent Vehicles, vol. 3, No. 3, Sep. 2018, 13 pages.

Homm et al., Efficient Occupancy Grid Computation on the GPU with Lidar and Radar for Road Boundary Detection, 2010 IEEE Intelligent Vehicles Symposium, Jun. 21-24, 2010, 8 pages, University of California, San Diego, CA, USA.

Li et al., Building Variable Resolution Occupancy Grid Map from Stereoscopic System—a Quadtree based Approach, Intelligent Vehicles Symposium (IV), IEEE, Jun. 2013, 7 pages.

Droeschel et al., Continuous Mapping and Localization for Autonomous Navigation in Rough Terrain using a 3D Laser Scanner, Robotics and Autonomous Systems, Oct. 27, 2016, vol. 88, 20 pages, Elsevier.

Dia et al., Evaluation of Occupancy Grid Resolution through a Novel Approach for Inverse Sensor Modeling, IFAC Papers OnLine, 50-1 (2017) 13841-13847, 7 pages, ScienceDirect.

Erdinc et al., The Bin-Occupancy Filter and its Connection to the PHD Filters, IEEE Transactions on Signal Processing, Nov. 2009, 13 pages, vol. 57, Issue: 11, IEEE.

Elfes, Using Occupancy Grids for Mobile Robot Perception and Navigation, Computer, Jun. 1989, 12 pages, vol. 22, Issue 6, IEEE.

Tanzmeister et al., Evidential Grid-Based Tracking and Mapping, IEEE Transactions on Intelligent Transportation Systems, Jun. 2017, 14 pages, vol. 18, Issue 6, IEEE.

* cited by examiner

OCCUPANCY VERIFICATION DEVICE AND METHOD

TECHNICAL FIELD

Various aspects of this disclosure generally relate to driving safety systems.

BACKGROUND

Autonomous Driving (AD) utilizes driving safety systems that process detected data of the environment of an autonomous vehicle (AV) to implement a driving procedure. Developing safe and functional AVs has proved challenging. Some of these challenges are due to AV's complex computational chain, which is required to extract an actuation command for the AV from its sensor information. This multistage pipeline includes sensing, perception, planning and actuation, and it is exposed to various sources of uncertainty and nondeterminism. This may be particularly true for artificial intelligence (AI)-based components (e.g., artificial neural networks, etc.), which may be commonly used in AVs.

Previous efforts to improve safety have often included redundancy or multiplicity, such as performing the same functionality simultaneously or currently on multiple processors, or performing the same action multiple times on the same processor (e.g. such as with object extraction or trajectory planning). If the diversity is sufficiently large, it can be argued that this functionality provides increased safety by always considering the worst-case scenario. However, such tactics are computationally very expensive, which may be undesirable for certain implementations. Moreover, with such tactics, it may be difficult to prove nonexistence of common cause failures or degradation. As such, it may be difficult or impossible to obtain certain functional safety certifications using this approach. Finally, these tactics also generally require accelerators and high performance processors, for which it may be difficult to ensure correctness and functional safety.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
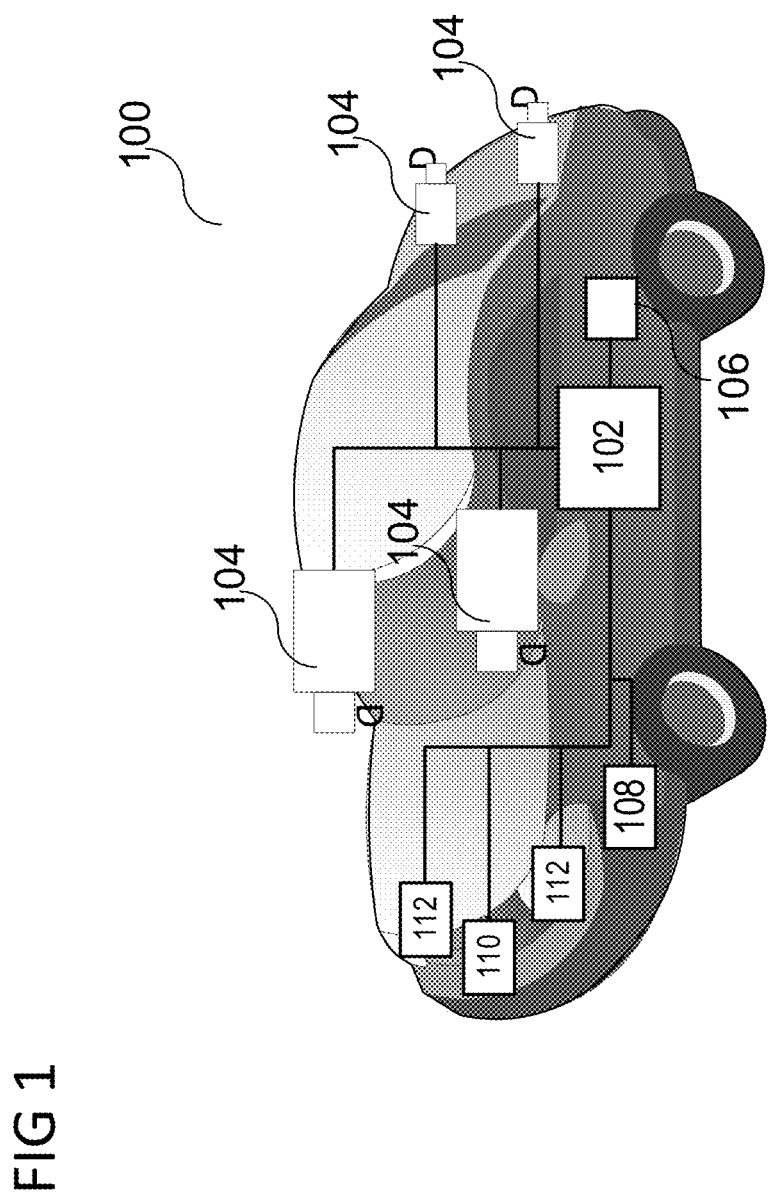
FIG. 1 shows an exemplary autonomous vehicle in accordance with various aspects of the present disclosure.

The following detailed description refers to the accompanying drawings that show, by way of illustration, exemplary details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The terms "group (of)", "set (of)", "collection (of)", "series (of)", "sequence (of)", "grouping (of)", etc., and the like in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, and the like.

A "ground vehicle" may be understood to include any type of vehicle, as described above, which is driven on the ground, e.g., on a street, on a road, on a track, on one or more rails, off-road, etc.

The term "autonomous vehicle" may describe a vehicle capable of implementing at least one navigational change without driver input. A navigational change may describe or include a change in one or more of steering, braking, or acceleration/deceleration of the vehicle. A vehicle may be described as autonomous even in case the vehicle is not fully automatic (for example, fully operational with driver or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

In the context of the present disclosure, "vehicle operation data" may be understood to describe any type of feature related to the operation of a vehicle. By way of example, "vehicle operation data" may describe the status of the vehicle such as the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, etc. More generally, "vehicle operation data" may describe or include varying features or varying vehicle operation data (illustratively, time-varying features or data).

Various embodiments herein may utilize one or more machine learning models to perform or control functions of the vehicle (or other functions described herein). The term "model" as, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may be used during an inference phase to make predictions or decisions based on input data. In some aspects, the trained machine learning model may be used to generate additional training data. An additional machine learning model may be adjusted during a second training phase based on the generated additional training data. A trained additional machine learning model may be used during an inference phase to make predictions or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to predict the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, Laser Imaging, Detection, and Ranging (LIDAR) data and the like. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

Throughout the present disclosure, the following terms will be used as synonyms: driving parameter set, driving model parameter set, safety layer parameter set, driver assistance, automated driving model parameter set, and/or the like (e.g., driving safety parameter set).

Furthermore, throughout the present disclosure, the following terms will be used as synonyms: driving parameter, driving model parameter, safety layer parameter, driver assistance and/or automated driving model parameter, and/or the like (e.g., driving safety parameter).

Figure 2:
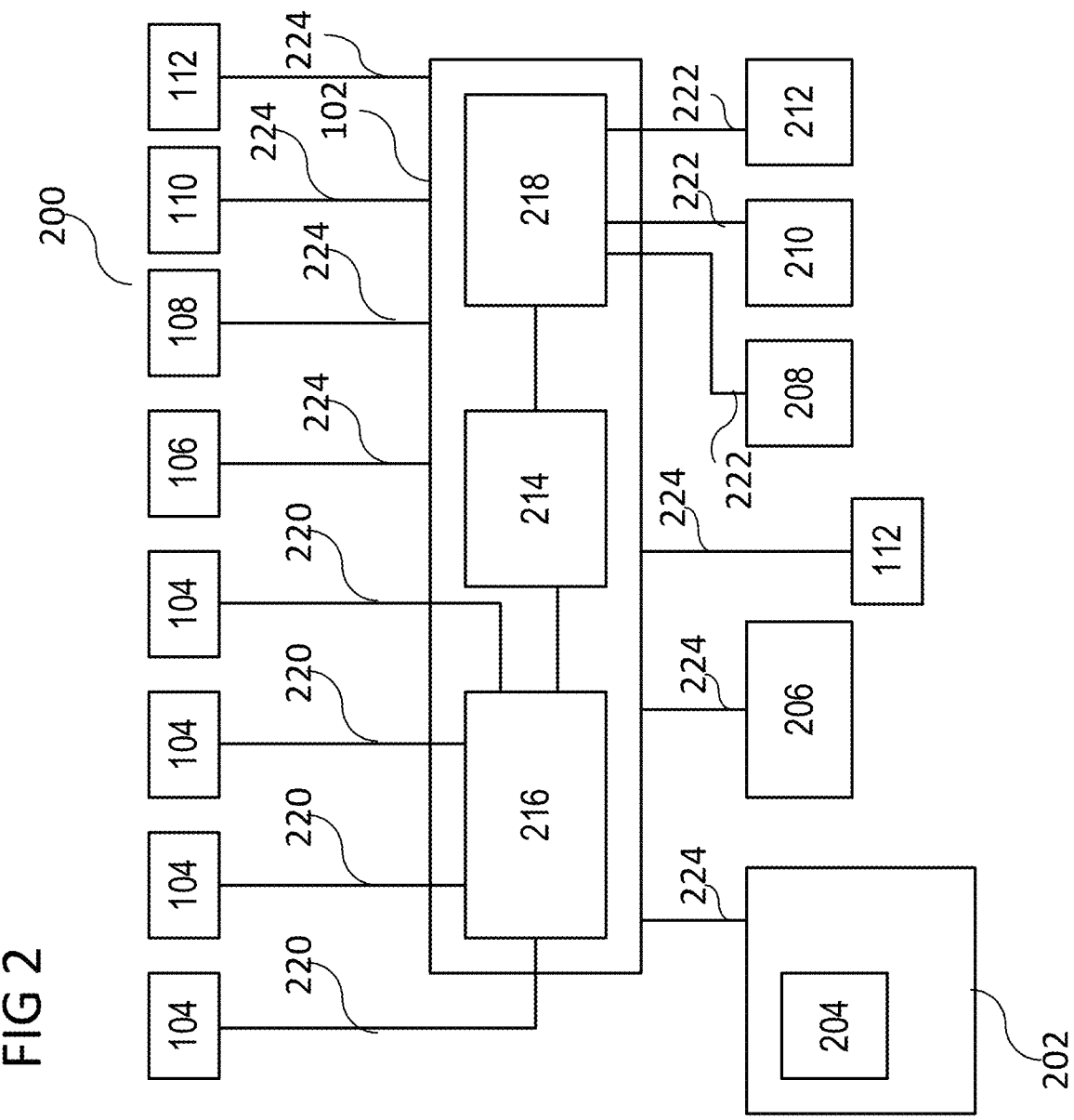
FIG. 2 shows various exemplary electronic components of a safety system of the vehicle in accordance with various aspects of the present disclosure.

FIG. 1 shows a vehicle 100 including a safety system 200 (see also FIG. 2) in accordance with various aspects of the present disclosure. It is appreciated that vehicle 100 and safety system 200 are exemplary in nature and may thus be simplified for explanatory purposes. Locations of elements and relational distances (as discussed above, the figures are not to scale) are provided as examples and are not limited thereto. The safety system 200 may include various components depending on the requirements of a particular implementation. As shown in FIG. 1 and FIG. 2, the safety system 200 may include one or more processors 102, one or more image acquisition devices 104 such as, e.g., one or more cameras, one or more position sensors 106 such as a Global Navigation Satellite System (GNSS), e.g., a Global Positioning System (GPS), one or more memories 202, one or more map databases 204, one or more user interfaces 206 (such as, e.g., a display, a touch screen, a microphone, a loudspeaker, one or more buttons and/or switches, and the like), and one or more wireless transceivers 208, 210, 212. The wireless transceivers 208, 210, 212 may be configured according to different desired radio communication protocols or standards. By way of example, a wireless transceiver (e.g., a first wireless transceiver 208) may be configured in accordance with a Short Range mobile radio communication standard such as e.g. Bluetooth, Zigbee, and the like. As another example, a wireless transceiver (e.g., a second wireless transceiver 210) may be configured in accordance with a Medium or Wide Range mobile radio communication standard such as e.g. a 3G (e.g. Universal Mobile Telecommunications System—UMTS), a 4G (e.g. Long Term Evolution—LTE), or a 5G mobile radio communication standard in accordance with corresponding 3GPP (3$^{rd}$ Generation Partnership Project) standards. As a further example, a wireless transceiver (e.g., a third wireless transceiver 212) may be configured in accordance with a Wireless Local Area Network communication protocol or standard such as e.g. in accordance with IEEE 802.11 (e.g. 802.11, 802.11a, 802.11b, 802.11g, 802.11n, 802.11p, 802.11-12, 802.11ac, 802.11ad, 802.11ah, and the like). The one or more wireless transceivers 208, 210, 212 may be configured to transmit signals via an antenna system over an air interface.

The one or more processors 102 may include an application processor 214, an image processor 216, a communication processor 218, or any other suitable processing device. Similarly, image acquisition devices 104 may include any number of image acquisition devices and components depending on the requirements of a particular application. Image acquisition devices 104 may include one or more image capture devices (e.g., cameras, CCDs (charge coupling devices), or any other type of image sensor). The safety system 200 may also include a data interface communicatively connecting the one or more processors 102 to the one or more image acquisition devices 104. For example, a first data interface may include any wired and/or wireless first link 220 or first links 220 for transmitting image data acquired by the one or more image acquisition devices 104 to the one or more processors 102, e.g., to the image processor 216.

The memories 202 as well as the one or more user interfaces 206 may be coupled to each of the one or more processors 102, e.g., via a third data interface. The third data interface may include any wired and/or wireless third link 224 or third links 224. Furthermore, the position sensor 106 may be coupled to each of the one or more processors 102, e.g., via the third data interface.

Each processor 214, 216, 218 of the one or more processors 102 may include various types of hardware-based processing devices. By way of example, each processor 214, 216, 218 may include a microprocessor, pre-processors (such as an image pre-processor), graphics processors, a central processing unit (CPU), support circuits, digital signal processors, integrated circuits, memory, or any other types of devices suitable for running applications and for image processing and analysis. In some aspects, each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors and may also include video output capabilities.

Any of the processors 214, 216, 218 disclosed herein may be configured to perform certain functions in accordance with program instructions which may be stored in a memory of the one or more memories 202. In other words, a memory of the one or more memories 202 may store software that, when executed by a processor (e.g., by the one or more processors 102), controls the operation of the system, e.g., the safety system. A memory of the one or more memories 202 may store one or more databases and image processing software, as well as a trained system, such as a neural network, or a deep neural network, for example. The one or more memories 202 may include any number of random access memories, read only memories, flash memories, disk drives, optical storage, tape storage, removable storage and other types of storage.

In some aspects, the safety system 200 may further include components such as a speed sensor 108 (e.g., a speedometer) for measuring a speed of the vehicle 100. The safety system may also include one or more accelerometers (either single axis or multiaxis) (not shown) for measuring accelerations of the vehicle 100 along one or more axes. The safety system 200 may further include additional sensors or different sensor types such as an ultrasonic sensor, a thermal sensor, one or more radar sensors 110, one or more LIDAR sensors 112 (which may be integrated in the head lamps of the vehicle 100), and the like. The radar sensors 110 and/or the LIDAR sensors 112 may be configured to provide pre-processed sensor data, such as radar target lists or LIDAR target lists. The third data interface may couple the speed sensor 108, the one or more radar sensors 110 and the one or more LIDAR sensors 112 to at least one of the one or more processors 102.

The one or more memories 202 may store data, e.g., in a database or in any different format, that, e.g., indicate a location of known landmarks. The one or more processors 102 may process sensory information (such as images, radar signals, depth information from LIDAR or stereo processing of two or more images) of the environment of the vehicle 100 together with position information, such as a GPS coordinate, a vehicle's ego-motion, etc., to determine a current location of the vehicle 100 relative to the known landmarks, and refine the determination of the vehicle's location. Certain aspects of this technology may be included in a localization technology such as a mapping and routing model.

The map database 204 may include any type of database storing (digital) map data for the vehicle 100, e.g., for the safety system 200. The map database 204 may include data relating to the position, in a reference coordinate system, of various items, including roads, water features, geographic features, businesses, points of interest, restaurants, gas stations, etc. The map database 204 may store not only the locations of such items, but also descriptors relating to those items, including, for example, names associated with any of the stored features. In such aspects, a processor of the one or more processors 102 may download information from the map database 204 over a wired or wireless data connection to a communication network (e.g., over a cellular network and/or the Internet, etc.). In some cases, the map database 204 may store a sparse data model including polynomial representations of certain road features (e.g., lane markings) or target trajectories for the vehicle 100. The map database 204 may also include stored representations of various recognized landmarks that may be provided to determine or update a known position of the vehicle 100 with respect to a target trajectory. The landmark representations may include data fields such as landmark type, landmark location, among other potential identifiers.

Furthermore, the safety system 200 may include a driving model, e.g., implemented in an advanced driving assistance system (ADAS) and/or a driving assistance and automated driving system. By way of example, the safety system 200 may include (e.g., as part of the driving model) a computer implementation of a formal model such as a safety driving model. A safety driving model may be or include a mathematical model formalizing an interpretation of applicable laws, standards, policies, etc. that are applicable to self-driving (ground) vehicles. A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic and in turn limit the scalability of system deployment; and third, the interpretation should be efficiently verifiable in the sense that it can be rigorously proven that the self-driving (autonomous) vehicle correctly implements the interpretation of the law. A safety driving model, illustratively, may be or include a mathematical model for safety assurance that enables identification and performance of proper responses to dangerous situations such that self-perpetrated accidents can be avoided.

A safety driving model may implement logic to apply driving behavior rules such as the following five rules:

Do not hit someone from behind.
Do not cut-in recklessly.
Right-of-way is given, not taken.
Be careful of areas with limited visibility.
If you can avoid an accident without causing another one, you must do it.

It is to be noted that these rules are not limiting and not exclusive and can be amended in various aspects as desired. The rules rather represent a social driving contract that might be different depending on the region and may also develop over time. While these five rules are currently applicable in most of the countries they might not be complete and may be amended.

As described above, the vehicle 100 may include the safety system 200 as also described with reference to FIG. 2.

The vehicle 100 may include the one or more processors 102 e.g. integrated with or separate from an engine control unit (ECU) of the vehicle 100.

The safety system 200 may in general generate data to control or assist to control the ECU and/or other components of the vehicle 100 to directly or indirectly control the driving of the vehicle 100.

Although the following aspects will be described in association with the safety driving model, any other driving model may be provided in alternative implementations.

The one or more processors 102 of the vehicle 100 may implement the following aspects and methods.

It is desired to create a simple and low-cost redundant monitoring and recovery path that can be used to achieve correct operation of a complete system. Ideally, this simple approach can be validated as being functionally safe using formal methods. Moreover, it is desired to be able to reduce complexity and cost of processors.

In the following, attention will be directed to the safety approach for the planning component, which may be referred to as a Safety Driving Module. Safety Driving Modules may be considered formal, mathematical models for AV safety, which may be intended to be used as a safety model for AV decision making. Safety Driving Modules may include a set of rules, which are modeled through a set of mathematical equations that describe the physics of reasonable worst case driving situations involving other road users. Using these rule, the safety system can determine whether the current state of the AV is safe.

If the state is determined to be unsafe, Safety Driving Modules may recommend restrictions of the actuator control commands, said restrictions being selected to return the AV back to a safe state. Consequently, Safety Driving Modules can be used as an independent safety layer for the decision making components inside an AV stack.

To perform its intended function, Safety Driving Modules may require a complete and correct environment model containing all objects with their locations, orientations and velocities in the environment of the ego vehicle. If any of these information is missing or incorrect, Safety Driving Modules may no longer be able to determine whether the vehicle behavior is safe. Therefore, it may be necessary to verify the correctness of the Safety Driving Module environment model input.

In the architecture disclosed herein, the object information provided to Safety Driving Modules can be verified and corrected as needed. For example, should the monitor detect a missing object (e.g., by having grid occupancy but no corresponding object), the corresponding occupied grid cells can be used as independent objects. Using this data, Safety Driving Modules can evaluate potential conflicts among these cells and by that means avoid dangerous situations.

Occupancy grids are a widely used method of modeling the environment of autonomous vehicles. Generally, occupancy grids divide the environment surrounding a vehicle into discrete grid cells. Each cell stores a stochastic state representation, where the state may be static occupied, dynamic occupied, free or unknown. The dynamic occupied cells may also provide information about the velocity of the current cell.

One or more processors may estimate the dynamic occupancy grid based on information from one or more sensors (e.g., LIDAR information, Radar information, camera information, ultrasound information, etc.) by using particle filters. Emerging sensor technologies such as HD Radar or LIDAR may provide both location and velocity, thereby allowing the processors to derive the occupancy grid information directly from the sensor information.

For continuous measurements, the one or more processors may combine the cell state from the previous time step with the current estimated state using the same combination rules. This approach may permit satisfactory determination of the freespace in cluttered and static environments.

More recently, the use of occupancy grids has successfully been extended to dynamic environments by using dynamic occupancy grids. These dynamic occupancy grids show promising results, particularly in urban or densely populated driving scenarios. In this case, cells may not be merely occupied, but rather dynamically occupied or statically occupied, with corresponding velocity information. In many circumstances, it may be advantageous to use a dynamic occupancy grid rather than a conventional occupancy grid (non-dynamic).

Dynamic occupancy grids may be low-level feature trackers that do not rely on complex object representation. Thus, dynamic occupancy grids may be able to fuse information without making assumptions about an underlying shape and model.

Despite their significant role in computer-guided driving applications, AVs do not generally rely on dynamic occupancy grids alone for making driving decisions. This may owe, at least, to the fact that limited sensor information is used to fill the grid. For example, such grids do not generally include height information, and objects extracted only from grid information generally lack a proper classification. Thus, AVs often employ more sophisticated, AI-based perception systems to identify objects and make driving decisions based on the identified objects. Nevertheless, low level feature trackers like a dynamic occupancy grid, may function well as a monitor/recovery system in the event of error.

Object identification systems may utilize information from the dynamic occupancy system and optionally from one or more other data sources (e.g., vehicle sensors such as LIDAR, radar, ultrasound, video, or any combination thereof) to identify one or more objects in a vicinity of the vehicle. Object identification may result in various failures or errors. Common errors include: false positives (e.g, a virtual object is identified where no corresponding object exists in the physical world); false negatives (no virtual object is identified despite a corresponding object existing in the physical world); error in velocity (object is associated with a velocity that does not correspond to a velocity of the detected object in the physical world; and error in position (detected object is attributed with an inaccurate position). Because errors in position are remedied by the strategies to address false positives and false negatives, as described herein, they will be addressed only with respect to false negatives and false positives.

For false positives, the environment model may include ghost objects that do not exist in the physical environment. Such false positives could lead to an unnecessary braking maneuver of the planning systems and therefore limit comfort or availability of the system. False Negatives may lead to a collision, since the planning systems would not generally be aware of the missing object, and thus cannot react properly. Errors in velocity may also lead to a collision, as the actual velocity of the object may not be properly considered.

Figure 3:
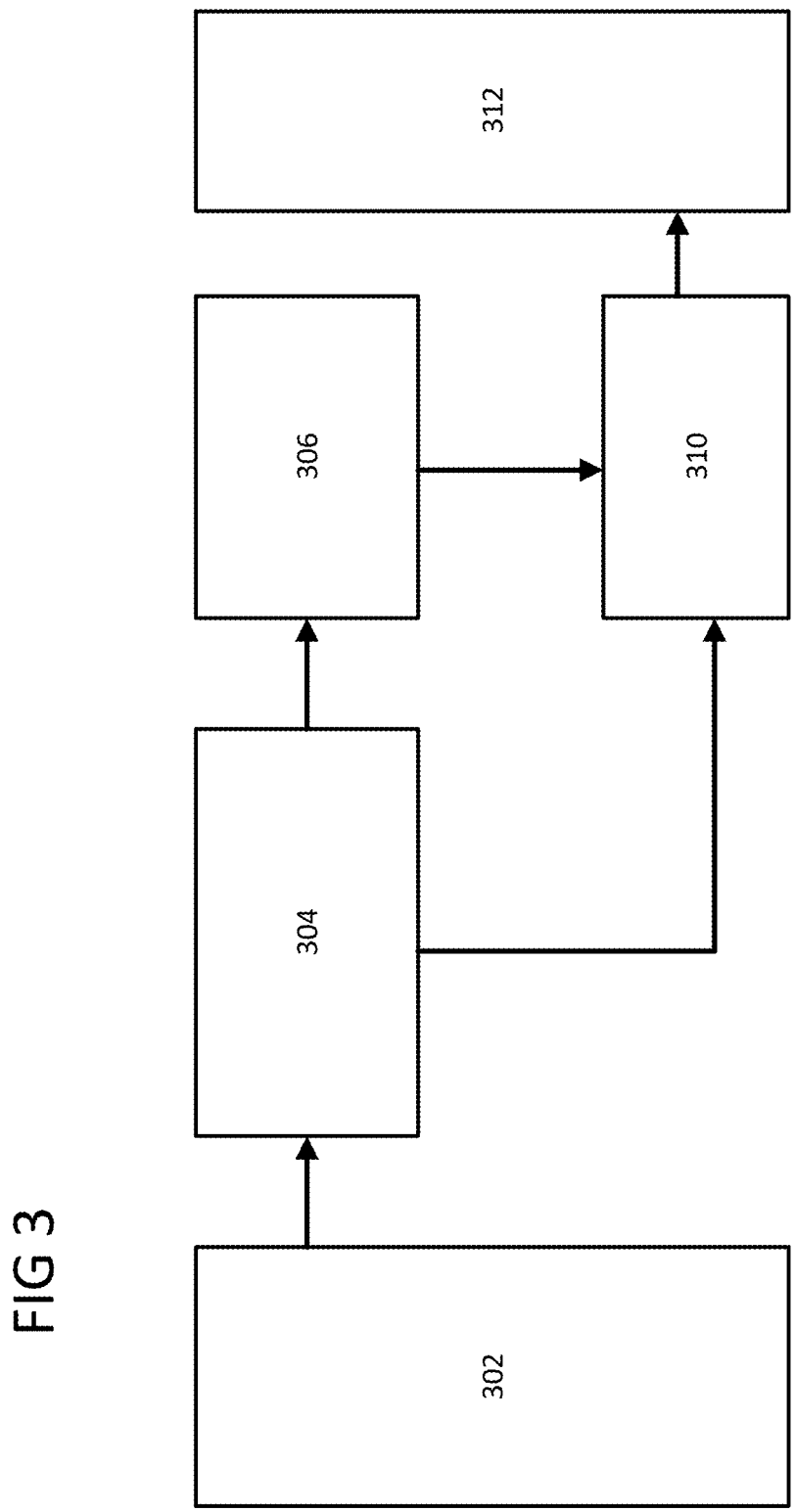
FIG. 3 depicts a conventional AV system stack.

FIG. 3 depicts a conventional AV system stack. The conventional AV system stack may include sensor layer 302, which may further include one or more diverse and/or redundant sensors (e.g. cameras, radar, LIDAR, or any combination thereof). The conventional AV system stack may further include a perception layer 304, which may extract from the sensor data object information for localization, object fusion, and/or tracking. The conventional AV system stack may further include a planning layer 306, that may use the resulting information, which may often be referred to as an environment model, to perform the steps required for decision making and trajectory generation. The conventional AV system stack may further include an Safety Driving Module 310, which may make driving decisions based on information received from the planning layer 306. Finally, the conventional AV system stack may further include one or more vehicle actuators 312, which may receive and implement driving commands from the Safety Driving Module layer.

In performing these steps, the AV system stack may implement AI-based approaches for the perception layer, as AIs are associated with increased performance over conventional algorithmic methods of object detection/extraction/tracking, etc. Despite AI's excellent performance in this regard, it may be very difficult to validate the AI's output with respect to objects. This may result at least from the fact that the AI evaluation is largely opaque. In many cases, the procedures by which the AI evaluates sensor data and/or dynamic occupancy grid data to determine the presence or absence of objects may be essentially unknown.

Figure 4:
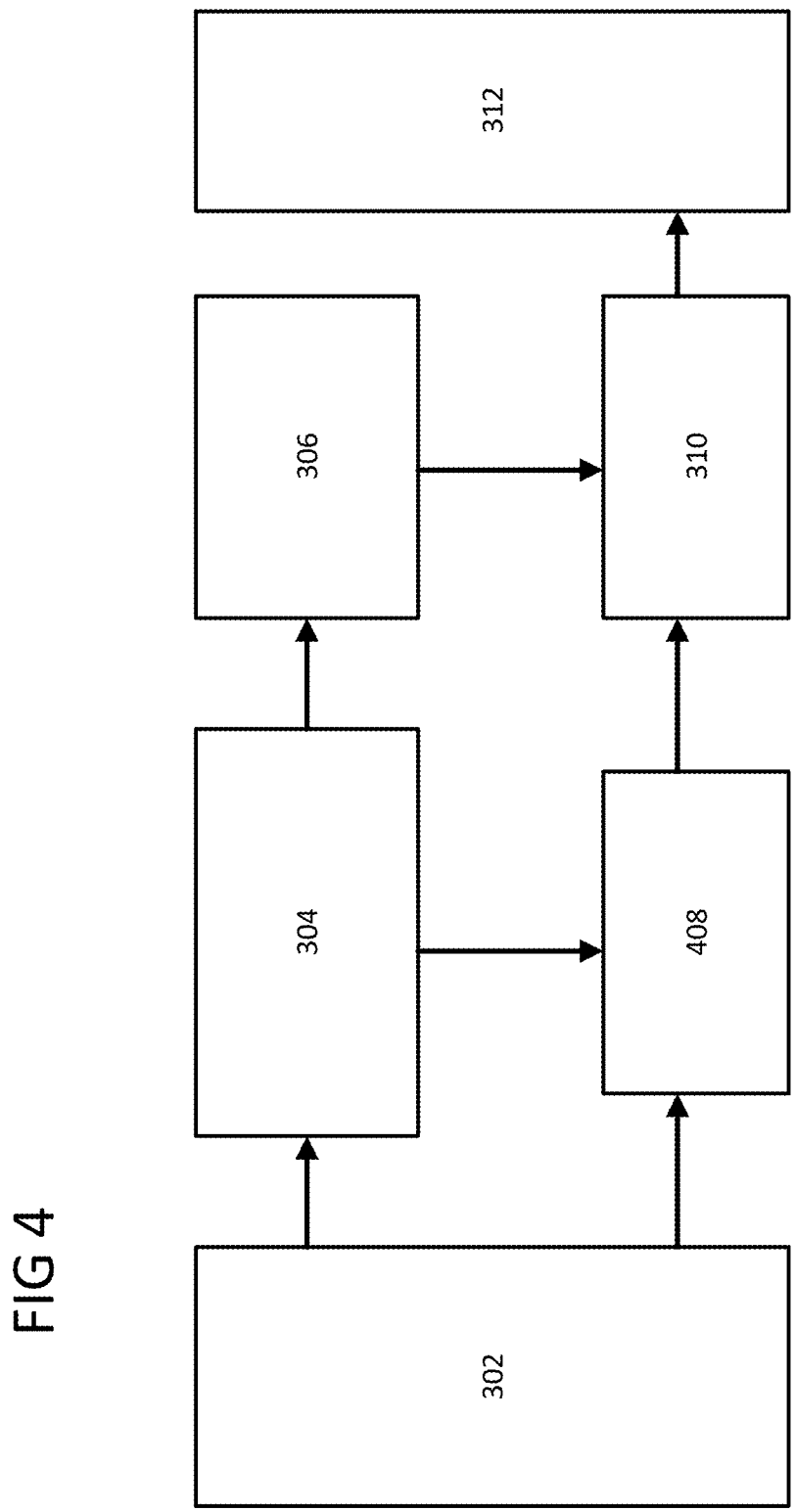
FIG. 4 shows a modified AV system stack, according to an aspect of the disclosure.

In light of the foregoing, the AV system stack may lack an ability to verify the correctness of the planning and perception layers. FIG. 4 shows a modified AV system stack, according to an aspect of the disclosure. As in the previous figure, the safety stack of FIG. 4 may include the sensor layer 302, the perception layer 304, the planning layer 306, the Safety Driving Module 310, and the one or more vehicle actuators 312. In addition to these layers, the modified AV stack of FIG. 4 may include a Safety Driving Module Input Validator 408, which may be configured to compare detected object data (e.g., existence or absence of an object, position, velocity, or any combination thereof), as described herein. The Safety Driving Module Input Validator 408 may receive information about detected objects, or information about an absence of a detected object, optionally along with object velocity information. As described herein, the Safety Driving Module Input Validator 408 may compare this received object information with cell information of a dynamic occupancy grid, including, but not limited to, occupancy probability information of one or more cells, and optionally velocity information. On the basis of these comparisons as described in greater detail herein, the Safety Driving Module Input Validator 408 may accept the detected object information, determine a false positive object detection to have occurred, determine a false negative object detection to have occurred, determine an incorrect velocity to have been detected, correct any of the previously listed detections, or any combination thereof.

Figure 5:
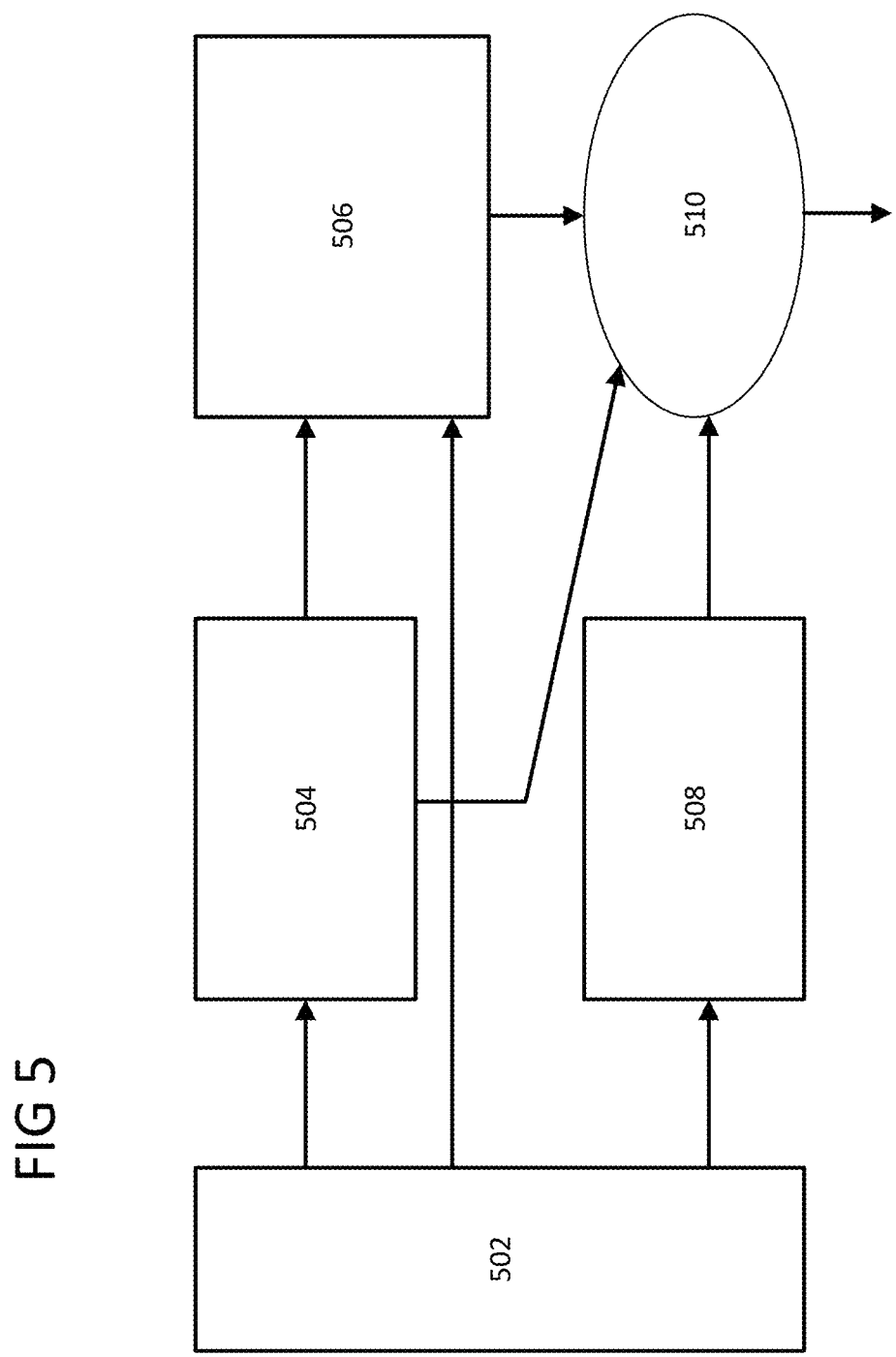
FIG. 5 discloses a Safety Driving Module according to an aspect of the disclosure.

FIG. 5 discloses a safety driving module according to an aspect of the disclosure. The Safety Driving Module may include an input module 502, which may receive sensor information, which may then processed by the complex function (object extraction, tracking and fusion, i.e., perception) 504 and the monitor 506. The sensor information may be any sensor information whatsoever for detecting objects for an AV, including, but not limited to, image sensor data, LIDAR data, Radar data, ultrasound data, etc. The monitor 506 may include a dynamic occupancy grid combined with logic for checking. The monitor may compare object information with occupancy grid information (presence or absence of objects, detected object velocity, etc.), and if the monitor detects potential conflicts between these data, the recovery function module 508 may utilize the occupancy grid information to modify detected object information (place one or more new objects in an area were no object was detected, delete an object where an object was detected, change object velocity information, etc.). A switch 510 may direct either the output of the complex function (object information from the complex perception layer) or data from the recovery function to the Safety Driving Module. The switch 510 may be a physical switch or a logical switch. The switch 510 may be implemented as software.

There are at least two problems that currently hinder mass deployment of AD systems. First, the current systems are very complex, and this complexity creates difficulties in having them certified according to existing safety standards (e.g, ISO26262). Second, the required computational performance often requires complex and/or costly hardware. To develop an economically feasible solution, it may be desired for major parts of the system and functionality to be developed without strict adherence to Functional Safety requirements, which may reduce costs and allows for reuse of existing (e.g., off-the-shelf) components. However, this may only be possible if a comprehensive safety layer is in place to assure safety of the overall system.

Even more challenging, a safety concept may be required for both the software and the hardware. Although certain hardware solutions have been proposed, it is still an open question how to design a safety strategy for the software of an AD system. For example, if the perception filters out an object, this cannot be wholly detected by the underlying hardware. Hence, a dedicated safety strategy for the software layer may be required as well.

A key challenge for such a software architecture may be that the monitor must be capable of detecting failures of the main channel (e.g. missing objects), while requiring significantly less computational complexity than the main channel. Therefore, a novel solution that uses a monitor-recovery approach with an occupancy grid for object perception is disclosed herein.

Safety Driving Modules may establish a monitor & recovery for the decision making of an automated vehicle. Nevertheless, Safety Driving Modules rely on information that they receive. If there is an error in this information that the Safety Driving Module receives, the Safety Driving Module is unlikely to function correctly. In order to assure correct behavior of the Safety Driving Module, it may be desired to validate the Safety Driving Module input.

Safety Driving Module input may include: map information; information about the ego vehicle, such as the position dimension and velocity and the route the vehicle wants to drive; environment model in an object representation; and object information.

Figure 6:
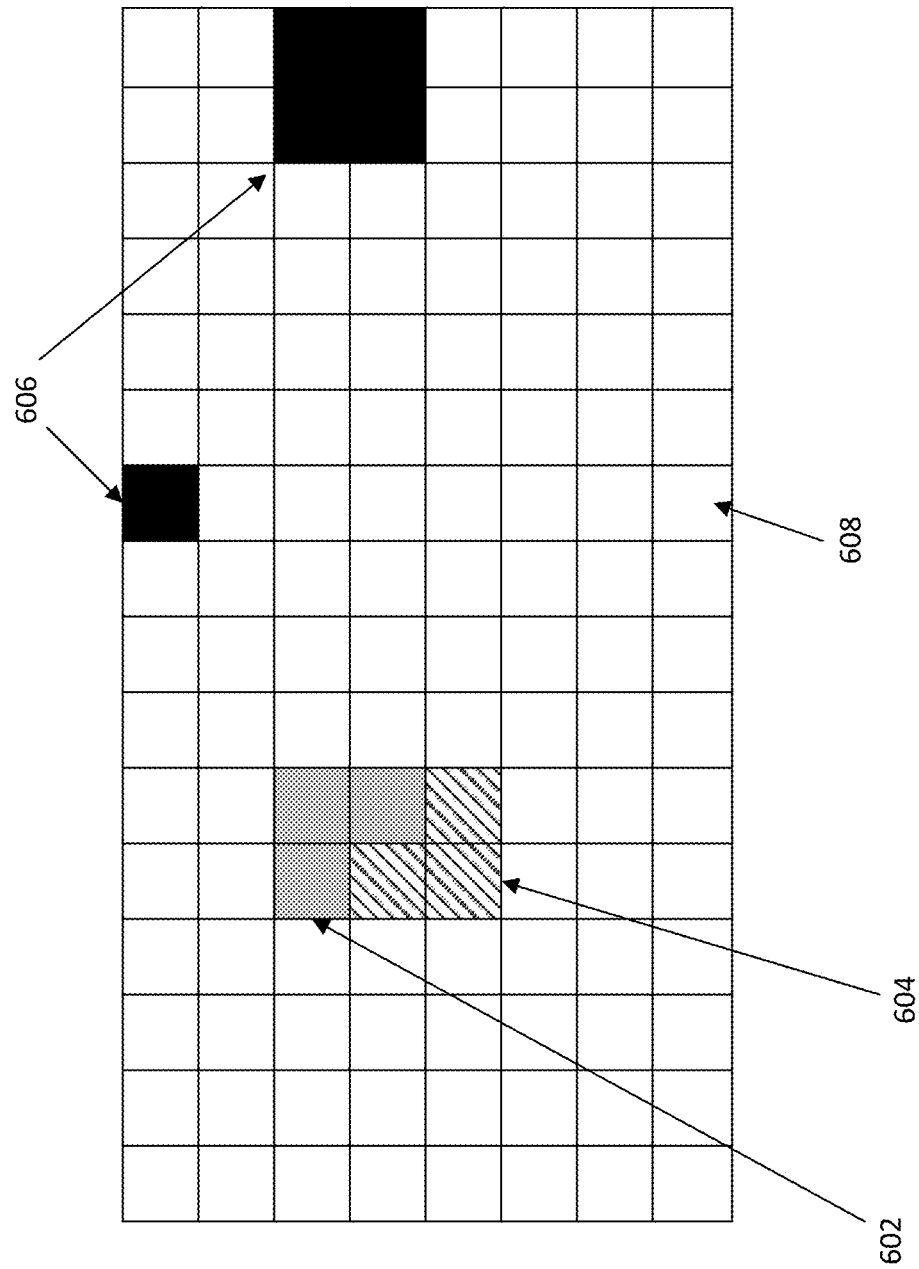
FIG. 6 shows a dynamic occupancy grid, according to an aspect of the disclosure.

One or more processors may represent sensor data in a dynamic occupancy grid. FIG. 6 shows a dynamic occupancy grid, according to an aspect of the disclosure. Based on received sensor data, the one or more processors may represent sensor data in any one or more of the occupancy grid cells. The one or more processors may designate the cells as being, for example, of unknown occupancy 602, of being dynamic occupied cells 604, static occupied cells 606, or free cells 608. Cells may be recorded as vectors, arrays, matrices, or in any other manner.

Objects may be described by the state of consisting of the position x; y, velocity vx; vy, dimension as bounding box and/or variance $\Sigma(o)$. Once the artificial intelligence has determined the location of one or more objects, the one or more processors may verify the validity of the object determination based on the dynamic occupancy grid. To perform this validation, the one or more processors may calculate the consistency and/or conflicts of the object position, the bounding box information and/or the variance with information in the occupancy grid. Based on these comparisons, the one or more processors may utilize one or more metrics and/or algorithms that permit the processors to determine whether the object detection represents a true positive or false positive.

Figure 7A:
FIGS. 7A and 7B show true positive object detection, according to an aspect of the disclosure.
Figure 7B:
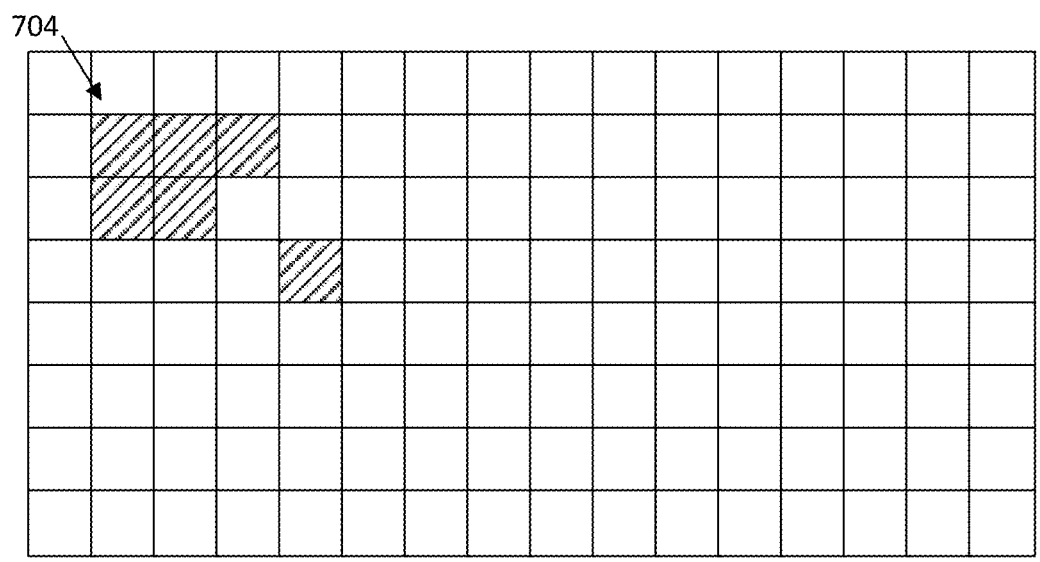

FIGS. 7A and 7B show a true positive object detection, according to an aspect of the disclosure. In FIG. 7A, a detected object 702 is represented on a grid. That is, one or more processors, which may optionally include an AI, receive dynamic occupancy grid information and, at least on the basis of the dynamic occupancy grid information, determine the presence or absence of one or more objects. Thus, where one or more objects are detected, they will ideally correspond to one or more cells of the dynamic occupancy grid that are determined to be occupied or have a high probability of being occupied. Conversely, where no object is detected, the absence of an object should correspond with one or more cells of the dynamic occupancy grid that are unoccupied or have a low probability of being occupied. FIG. 7B shows cells of the dynamic occupancy grid having data on which the object detection of FIG. 7A is based. Near the top, left portion of the dynamic occupancy grid, six cells 704 are indicated as being occupied. On the basis of the six cells, the one or more processors have detected an object, as shown in FIG. 7A. The one or more processors may be configured to compare the detected object with the occupied cells 704 of FIG. 7A, or vice versa, as will be discussed in greater detail. In this case, the locations of the occupied cells correspond closely with the location of the detected object. In FIG. 7B, a first row of three cells is indicated as being occupied, and a second of two cells is indicated as being occupied. The sixth and final cell of the two rows is indicated as being unoccupied; however, a diagonally-located cell is indicated as being occupied. Although not an exact match, there is a high level of correlation between the dynamic occupancy cells of FIG. 7B and the object of FIG. 7A based on the methods that will be further described herein. Accordingly, this represents a true detected positive.

It is noted that this example is presented for demonstrative purposes only, to show the relevant comparison and analysis, and it is not intended to be limiting to the particular number, configuration, or location of cells as described in this particular example.

Figure 8A:
FIGS. 8A and 8B show a false-positive, according to an aspect of the disclosure.
Figure 8B:
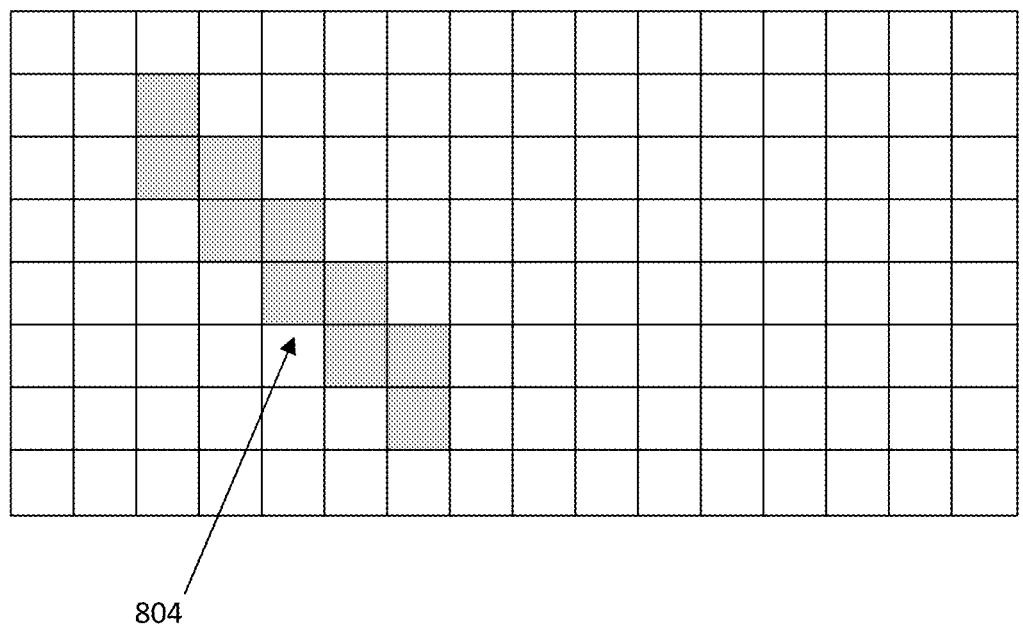

FIGS. 8A and 8B show a false-positive, according to an aspect of the disclosure. In FIG. 8A, and object 802 is detected on the basis of one or more cells 804 in a dynamic occupancy grid 8A. It can be seen that the location of the detected object in FIG. 8A does not correspond closely to the locations of the occupied cells 804 in FIG. 8B. The occupied cells 804 in FIG. 8B may correspond to a sensor error, sensor noise, or otherwise. In this example, a significant difference between the location of the detected object in FIG. 8A and the locations of the occupied cells in FIG. 8B is present. The one or more processors may analyze this difference and, if the one or more processors determine that the difference is outside of a predetermined range, the one or more processors may deem the detected object of FIG. 8A to represent a false positive.

Figure 9A:
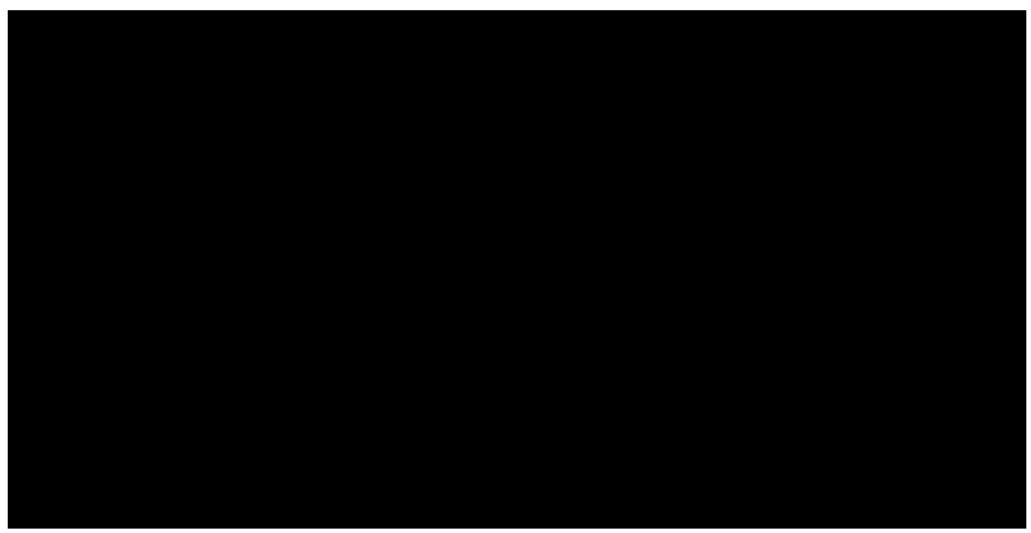
FIGS. 9A and 9B show a false-negative, according to an aspect of the disclosure.
Figure 9B:
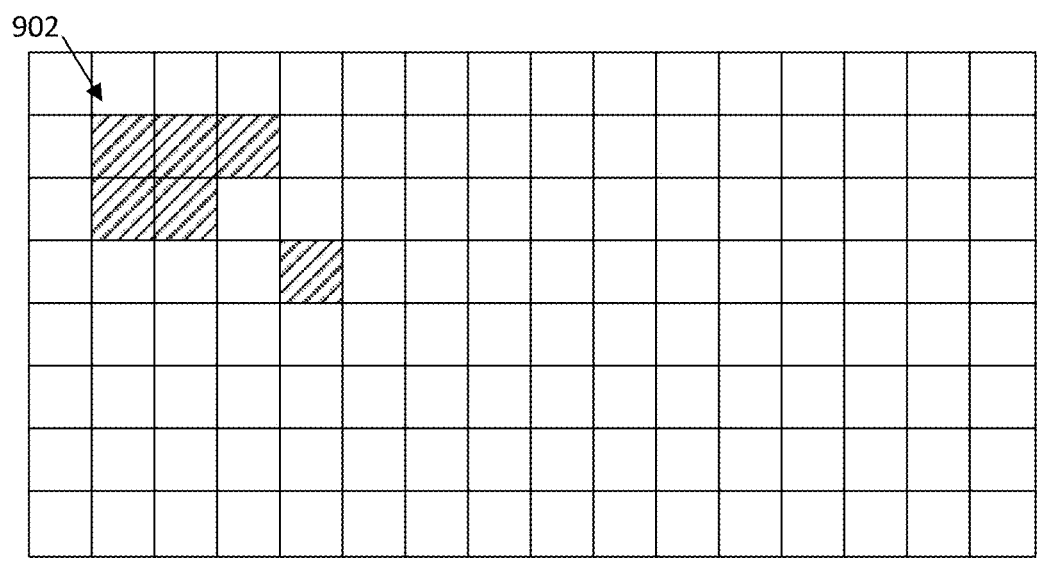

FIGS. 9A and 9B show a false-negative, according to an aspect of the disclosure. In these examples, the one or more processors (including but not limited to an IA) analyze dynamic occupancy grid data and detect that object is present within a given area. This negative detection is depicted in FIG. 9A, in which no obstacle is shown as being present. In contrast, however, FIG. 9B, on which the detection of no obstacle is based, shows a plurality of occupied cells 902. The one or more processors may analyze the lack of a detected object for an area corresponding to the plurality of occupied cells 902, and if a difference between the lack of the detected object and the plurality of occupied cells is outside of a predetermined range, the one or more processors may determine the lack of a detected obstacle to be a false negative.

The one or more processors may also utilize similar steps to evaluate determined object velocity. To verify object velocity, the one or more processors may compare the velocity distribution of the cells in an object region with the velocity distribution of the object using a comparing rule (e.g., a Bhattacharyya distance, an average, a standard deviation, or any combination thereof). That is, an object may include an associated velocity. Occupancy grid cells corresponding to an object's location may also include corresponding velocities, or velocities may be derivable from the cell data. A comparison of the object velocity and the cell velocities (whether directly obtained from the cell data or derived from the cell data) may be evaluated according to a comparing rule. Based on the results of this comparison, the velocity of the object may be confirmed, adjusted, or even deleted.

If errors in the objects are identified (e.g., false positive object detection, false negative object detection, or false velocity), the following possibilities for recovery may be available. First, in the event of a false positive, the one or more processors may remove the object representing the false positive from the list of detected objects or otherwise deactivate the object. In this case, the one or more processors may be configured to delete the object from the object data. Alternatively or additionally, the one or more processors may be confirmed to place a tag within the object data, the tag representing an instruction to delete or disregard some or all of the object information. Second, in the event of a false negative, the one or more processors may recover the object position and velocity information from the dynamic occupancy cell information. According to one aspect of the disclosure, the one or more processors may perform this in a simplistic manner by creating one object per cell, rather than an object representing multiple cells. Alternatively, the one or more processors may cluster a plurality of cells to derive a single object information out of the cluster. Third, in the event of false velocity information, the one or more processors may recover velocity information using cell velocity information within the dynamic occupancy grid.

In the following, the comparison between the presence or absence of an object with one or more cells of the dynamic occupancy grid will be described. Various AV safety models may utilize inputs including the states of all detected objects in an environment O. To be able to compare the object information with the occupancy grid information, the one or more processors may convert an object track into a spatial occupancy.

Therefore, the one or more processors may first determine the region that is covered by the object at a given point in time (e.g., the current time). The one or more processors may determine region Ao by the state o and its covariance matrix $\Sigma(o)$. The coverage function may be defined as $c(\zeta; o)$ that will determine the coverage for a position $\zeta$ and a given object o.

$$c(\zeta, o) = \begin{cases} 1, & \text{if } \zeta \in A_o \\ 0, & \text{if } \zeta | \notin A_o \end{cases} \quad (1)$$

The occupancy grid may provide the spatial occupancy probability for a position $\zeta$, which is denoted $P(\zeta)$. The consistency $\eta$ of the object position information and occupancy information may be understand as follows:

$$\eta = \max_{\zeta \in \mathbb{R}^2} (c(\zeta, o) * P(\zeta)) \quad (2)$$

The conflict κ among the grid and all objects o in the environment model O can be expressed as follows:

$$\kappa(\zeta) = \min_{\forall o \in O} (1 - c(\zeta, o)) * P(\zeta) \quad (3)$$

In order to validate the object velocity information, the one or more processors may calculate the Bhattacharyya distance $\delta$ between the multivariate distribution of the object velocity $\Sigma v(o)$ information and the occupancy grid velocity information $V(\zeta)$. This can be realized for each example with the following equation.

$$d(\zeta, O) = c(\zeta, o) * \delta(\Sigma_v(o), V(\zeta)) \quad (4)$$

With these metrics, the one or more processors can verify whether the environment model agrees or conflicts with the grid information. This can be understood as a procedure to verify true positive object detection; to correct false-positive object detection; to correct false negative-detected objects; and to correct velocity information.

With respect to correct positive object detection and false positive object detection, it is helpful to note that Safety Driving Modules generally expect a binary decision about whether an object exists. In contrast, dynamic occupancy grids include occupancy probability information of a plurality of cells, and thus do not often provide binary object information, but rather occupancy probability of cells which may represent an object. A Boolean function $f$ may determine whether the object position is in alignment with the grid information. Given the consistency $\eta$ and a selected parameter $T_{tp}$, this function can be realized as:

$$f(\eta, \tau) = \begin{cases} \text{false}, & \text{if } \eta < \tau_{tp} \\ \text{true}, & \text{if } \eta \geq \tau_{tp} \end{cases} \quad (5)$$

If function $f$ fails, the one or more processors may remove the object from the output sent to Safety Driving Module, as failure of the function indicates that the object represents a false positive.

With respect to false negative objects, and in order to validate whether an object has been missed by the perception chain, the one or more processors may exploit the conflict κ. If a false negative occurs, there is a region of high conflict κ. In order to recover from these false negatives, the one or more processors may create a new object for each cell with $\kappa > \tau_{fn}$, where $\tau_{fn}$ may be a user-defined parameter (for example, a parameter that permits tuning the sensitivity to False Negatives). In this way, the one or more processors may create a plurality of detected objects, wherein each of the plurality of detected objects represents a cell with a high probability of occupancy.

This recovery strategy does not, however, recover object dimensions. That is, in the event that a single object in the physical world is represented by a plurality of detected objects whose sizes correspond to cells of the dynamic occupancy grid, the dimensions of the detected object in the physical world remain undetermined. However, the Safety Driving Modules only require dimensions of the objects to determine the closest point to the ego vehicle. As such detecting a plurality of objects whose sizes correspond to the sizes of cells in a dynamic occupancy grid provides sufficient information for a safe driving decision from the perspective of an Safety Driving Module.

With respect to missing or incorrect velocity information, in order to verify the velocity information, it may be instructive to first consider all the cells in the grid that have been successfully classified as dynamic or static: $\mathbb{O} \subset \mathbb{R}^2$. The one or more processors may define a second Boolean function $f_{vel}$, as stated below, that can verify that the velocity is in an expected range.

$$f_{vel}(\zeta, o, \tau_v) = \begin{cases} 1, & \text{if } d(\zeta, o) < \tau_v \\ 0, & \text{if } d(\zeta, o) \geq \tau_v \end{cases} \quad (6)$$

The one or more processors may determine the ratio of conflict $\rho$ between grid and object information o with the following formula:

$$\rho(o) = \frac{\sum_{\forall \zeta \in \mathbb{O}} c(\zeta, o) f_{vel}(\zeta, o, \tau_v)}{\max\left(1, \sum_{\forall \zeta \in \mathbb{O}} c(\zeta, o)(1 - f_{vel}(\zeta, o, \tau_v))\right)} \quad (7)$$

If the ratio signals a conflict, the recovery strategy employed may be similar to the False Negative recovery function. The one or more processors may remove the initial detected object from the final environment model. Moreover, the one or more processors may add all cells that are in $\mathbb{O}$ as new objects to the environment model. In the event that $\mathbb{O} = \emptyset$; the one or more processors may be unable to make a statement on the velocity information, as the occupancy grid does not contain the required information for such a statement. In these situations, in order not to decrease the availability of the overall system, the one or more processors may assume that information in the environment model is correct.

Figure 10:
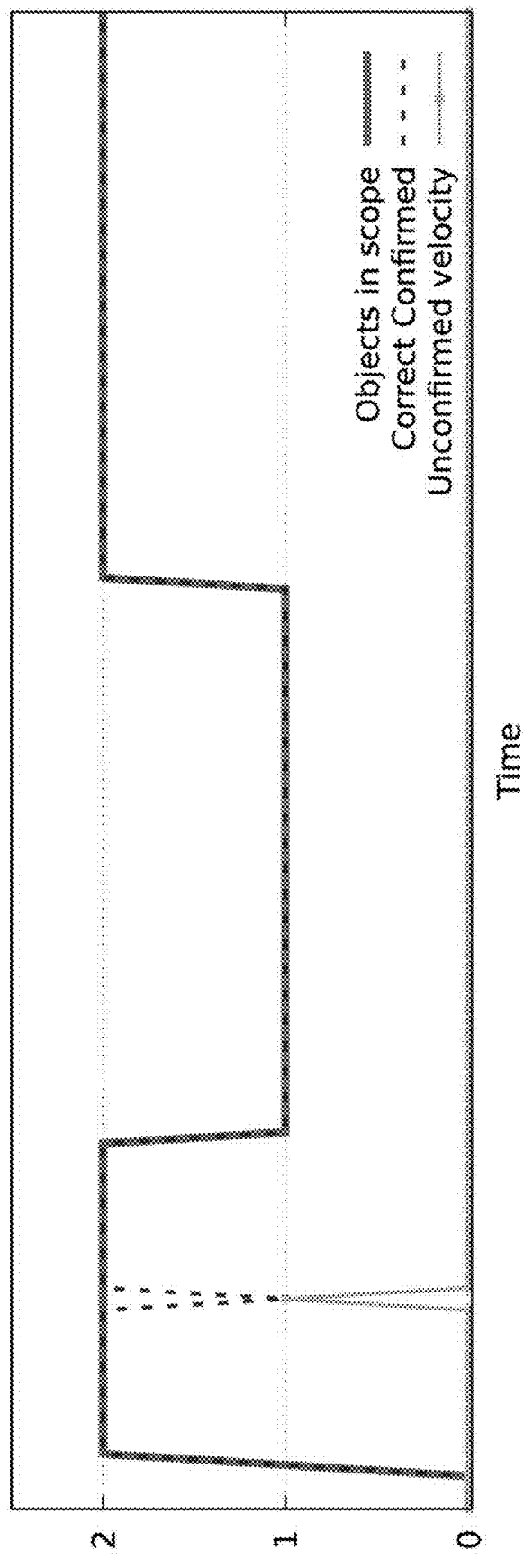
FIG. 10 shows an analysis of the monitor's ability to validate correct information, according to an aspect of the disclosure.

FIG. 10 shows an analysis of the monitor's ability to validate correct information, according to an aspect of the disclosure. In this figure, time is represented along the x-axis, and the number of objects is represented along the y-axis. In these experiments, the positions could be verified for all timestamps. The monitor was also able to verify the velocity information for most of the situations; however, occasionally the underlying dynamic occupancy grid algorithm failed to determine the dynamic belief for some objects, which was due to an inherent property in the dynamic grid implementation using particle filters. Hence, even with a more optimized implementation, these upsets can still occur under rare circumstances. The evaluation indicates that if the dynamic belief is too low, the monitor still can correctly validate the object position, and only the object velocity is flagged as uncertain. Consequently, the one or more processors can still use information of the object, and the overall system performance is not impacted. This figure indicates that, in tests of the model described herein, true positives were correctly classified 100% of the time.

Figure 11:
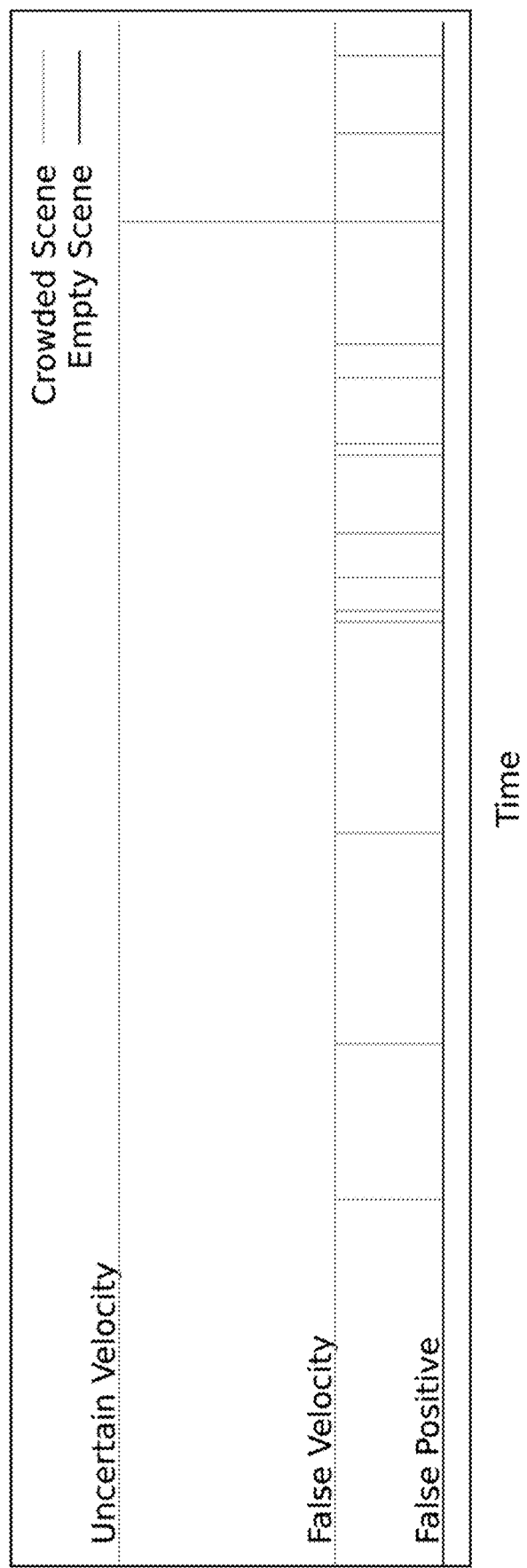
FIG. 11 shows comparison results with respect to false positives, according to an aspect of the disclosure.

FIG. 11 shows comparison results with respect to false positives, according to an aspect of the disclosure. First, a scenario was investigated in which no object was present the scene. In a second experiment, a scenario was investigated in which one or more objects were present in the scene. For both scenarios, a non-existent, random object was added to the environmental model in each processing step. It can be seen that for the scenario without any object in the environment, all False Positives were correctly identified. In the second scenario, the monitor occasionally failed to identify the False Positive. This was due to the fact that the randomly placed ghost object was generated at a position where an actual object was located. Although the positions matched in these cases, the velocity information often conflicted, and hence the monitor detected this issue. This can be remedied by checking objects for collision or overlap.

Figure 12:
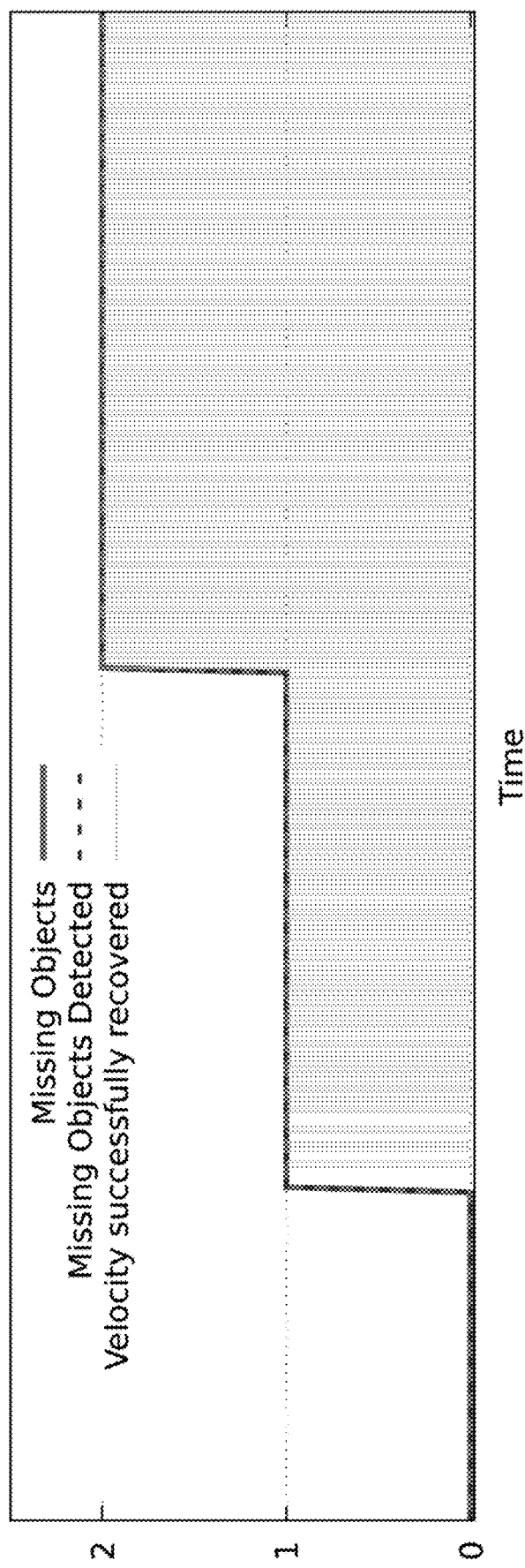
FIG. 12 shows results of an analysis of false positives, according to an aspect of the disclosure.

FIG. 12 shows results of an analysis of false positives, according to an aspect of the disclosure. In order to check the detection and recovery from missed objects (False Negatives) in the primary channel, all objects of the input to the environment model validation were first removed. Then for all the removed objects, it was determined whether the monitor was able to detect the missing objects and to create recovery objects. For this, the output of the validation was assessed to determine whether it contained objects that were within or in close proximity to the removed object. In a second step, the quality of the recovered velocity information was analyzed. Therefore, the speed and orientation of the recovered were compared with the information of the original object. The results show that missing objects were identified immediately, while the recovery of velocity information could require slightly more time. This was due to the fact that the underlying dynamic occupancy grid needs additional time to establish a reliable tracking of the velocity information. The recovery treats each cell as a new object, and thus there are often more objects recovered than were in the original input. Nevertheless, this is an acceptable solution, as the Safety Driving Module's driving decisions for a single object are expected to be identical to the Safety Driving Module's decisions for multiple smaller objects that are defined within a space corresponding to a space of the single object. That is, regardless of whether a single large object is present, or whether multiple smaller objects that together account for the location and size of the single large object are present, the Safety Driving Module is expected to reach the same driving decisions. To the extent that it is at least theoretically possible that the Safety Driving Module would reach different driving decisions in these two scenarios, it is expected that the Safety Driving Module would decide more conservatively (e.g., to make safer decisions) when multiple smaller objects are present.

Figure 13:
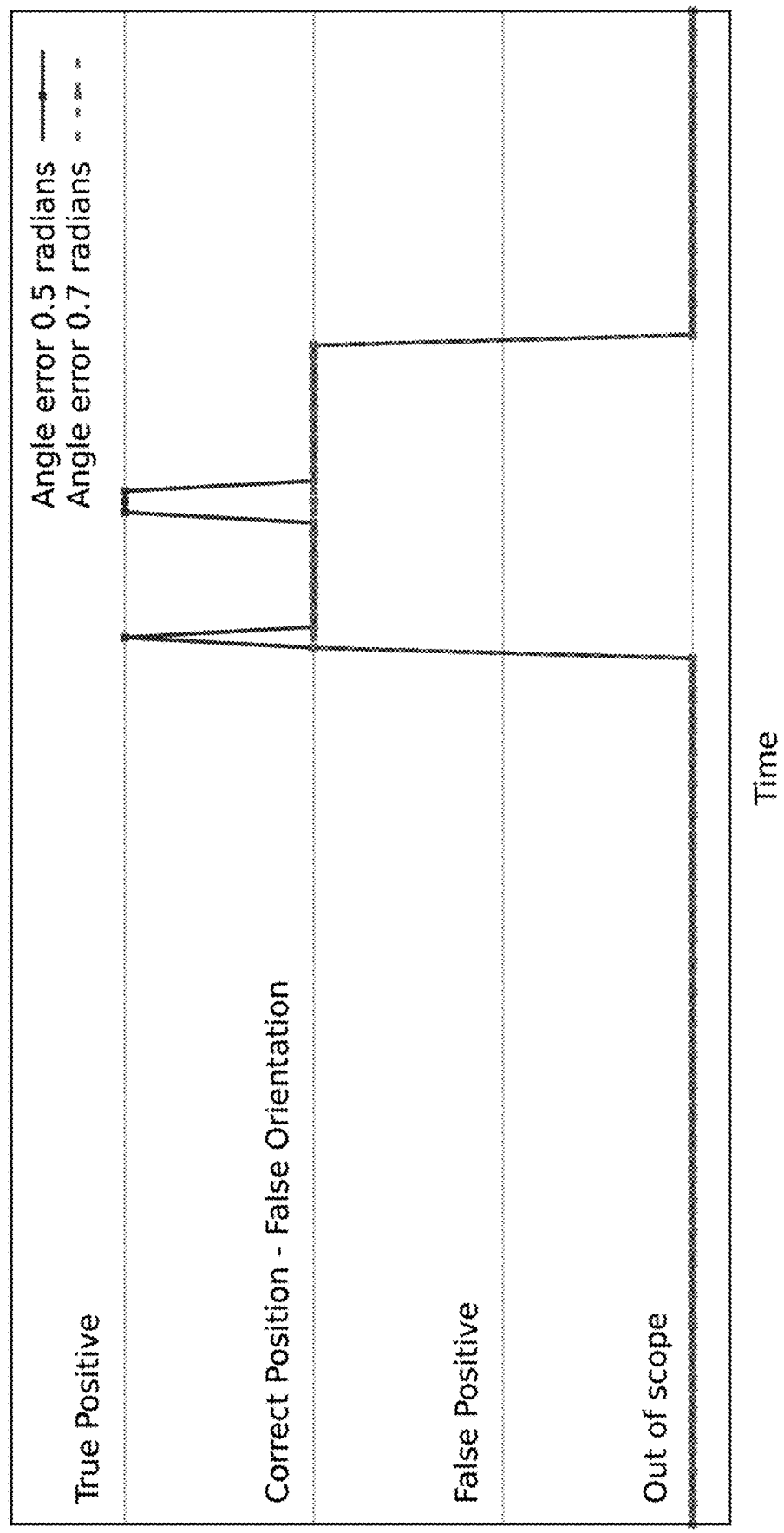
FIG. 13 shows an evaluation of velocity errors, according to an aspect of the disclosure.

FIG. 13 shows an evaluation of velocity errors, according to an aspect of the disclosure. To validate that detection of velocity errors, a first scenario in which a pedestrian is crossing the street in front of the ego vehicle was utilized. Two tests were run. In the first test, an error of 0.5 radians was added to the heading of the pedestrian. In the second test, an error of 0.7 radians was added. Results show that for the first test, the error was detected most of the times, whereas for the second scenario, the error was always detected.

Figure 14:
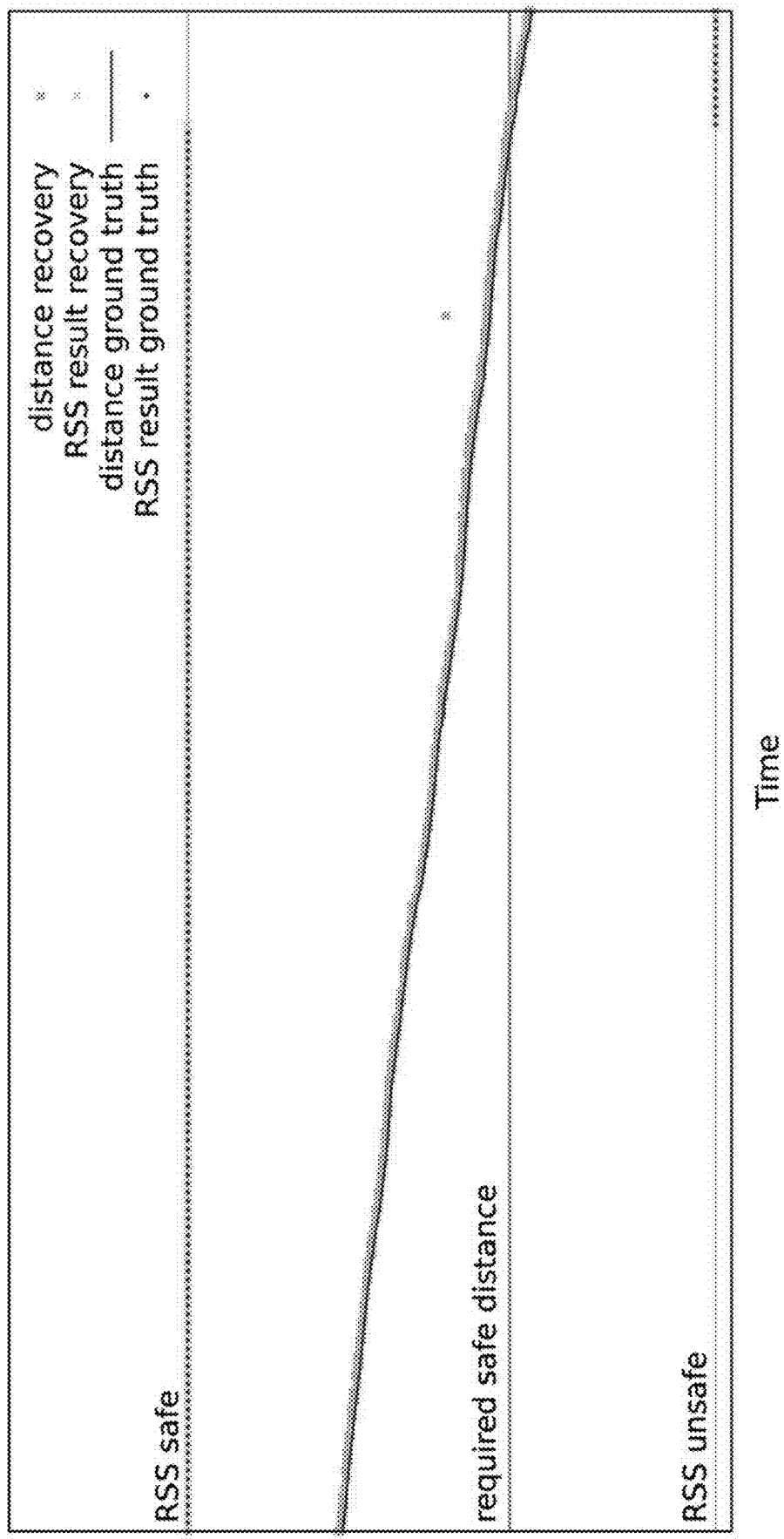
FIG. 14 shows results of a Safety Driving Module analysis according to an aspect of the disclosure.

FIG. 14 shows results of a Safety Driving Module analysis according to an aspect of the disclosure. In this case, a first group of ground truth information (known information about the position and/or velocity of obstacles relative to the ego vehicle) was provided to the Safety Driving Module, and a second group of corrected information using the principles and methods of recovery disclosed herein (recovered obstacle information) was provided to the Safety Driving Module. This chart indicates identical results of both categories, indicating that the Safety Driving Module operated identically using the ground truth information and the recovered information. This indicates that the recovered information can be safely used for AV operation.

Figure 15:
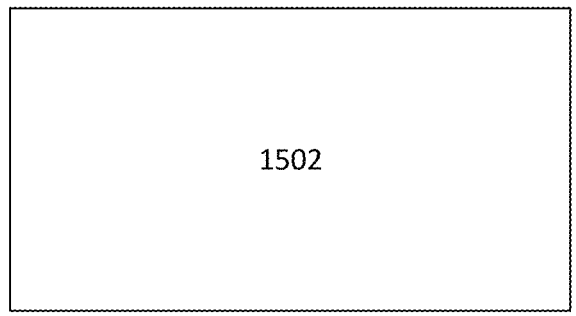
FIG. 15 shows an occupancy verification device, according to an aspect of the disclosure.

FIG. 15 shows an occupancy verification device, according to an aspect of the disclosure. The occupancy verification device may include one or more processors 1502, configured to receive occupancy grid data, representing a plurality of cells of an occupancy grid and for each cell of the plurality of cells, a probability of whether the cell is occupied; receive object location data, representing one or more locations of one or more objects identified using a model; map the object location data to one or more cells of the plurality of cells based on the one or more locations of the one or more objects; determine comparison grid data, representing the plurality of cells of the occupancy grid and for each cell of the plurality of cells, a probability of whether the cell is occupied based on whether the object location data are mapped to the cell; compare the occupancy grid data to the comparison grid data using at least one comparing rule; and output trust data representing a result of the comparison.

Figure 16:
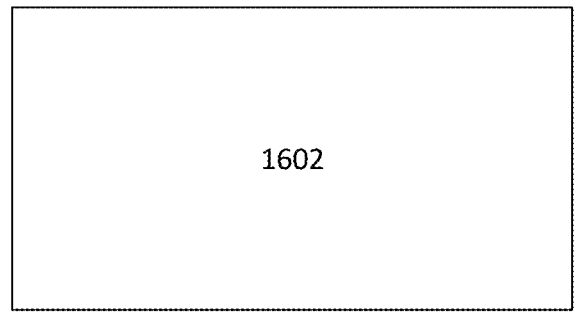
FIG. 16 shows an occupancy verification device according to another aspect of the disclosure.

FIG. 16 shows an occupancy verification device according to another aspect of the disclosure. The occupancy verification device may include one or more processors 1602, configured to receive occupancy grid data, representing occupancy of a plurality of cells and for each cell of the plurality of cells, a probability of whether the cell is occupied; receive object vacancy data, representing one or more locations in which no object has been detected; map the object vacancy data to one or more cells of the plurality of cells based on the one or more locations in which no object is detected; determine comparison grid data, representing the plurality of cells and for each cell of the plurality of cells, a probability of whether the cell is occupied based on whether no objects represented by the object vacancy data are mapped to the cell; compare the occupancy grid data to the comparison grid data using at least one comparing rule; and output trust data representing a result of the comparison.

Figure 17:
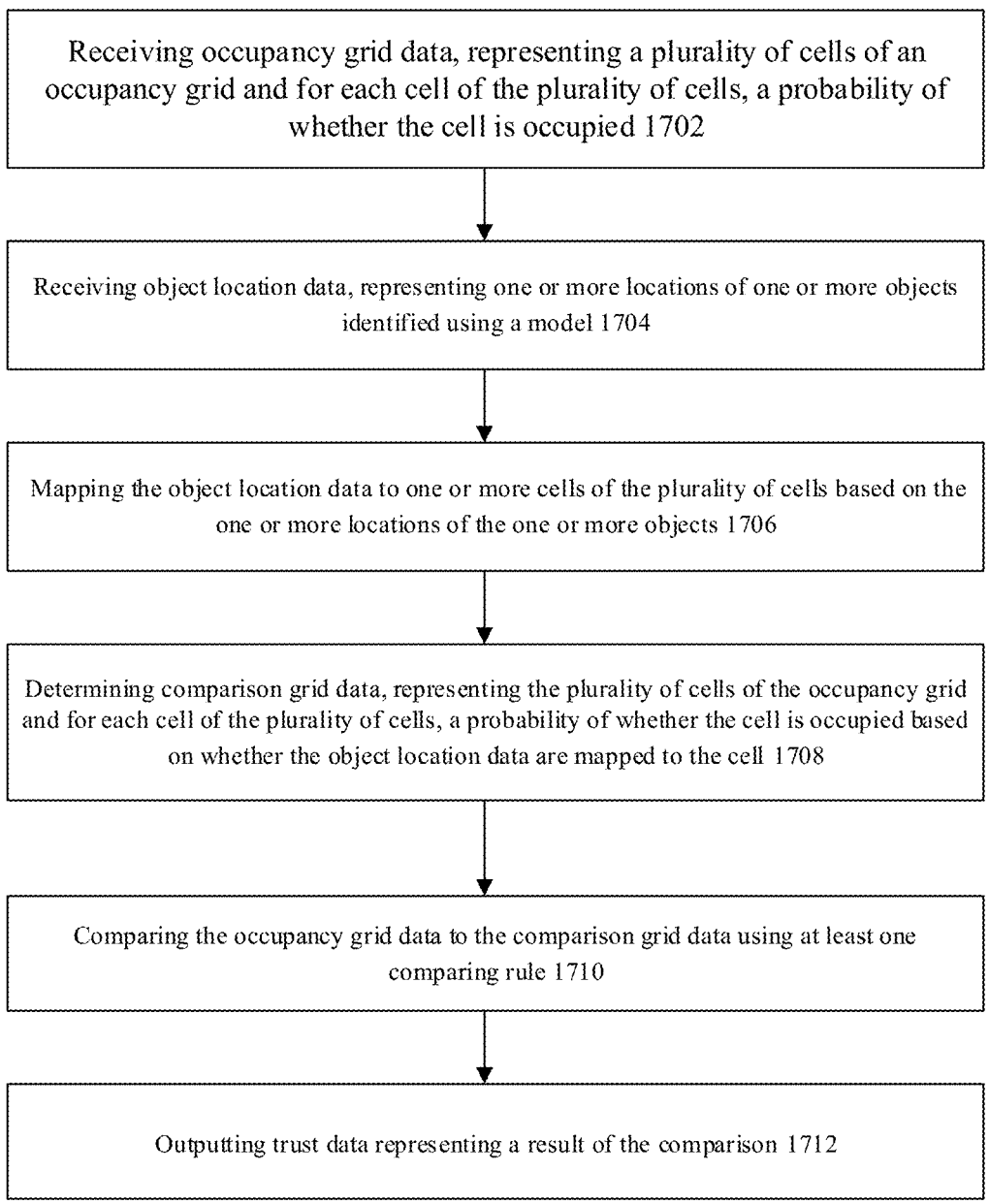
FIG. 17 shows a first method of occupancy verification.

FIG. 17 shows a method of occupancy verification according to an aspect of the disclosure, including receiving occupancy grid data, representing a plurality of cells of an occupancy grid and for each cell of the plurality of cells, a probability of whether the cell is occupied 1702; receiving object location data, representing one or more locations of one or more objects identified using a model 1704; mapping the object location data to one or more cells of the plurality of cells based on the one or more locations of the one or more objects 1706; determining comparison grid data, representing the plurality of cells of the occupancy grid and for each cell of the plurality of cells, a probability of whether the cell is occupied based on whether the object location data are mapped to the cell 1708; comparing the occupancy grid data to the comparison grid data using at least one comparing rule 1710; and outputting trust data representing a result of the comparison 1712.

Figure 18:
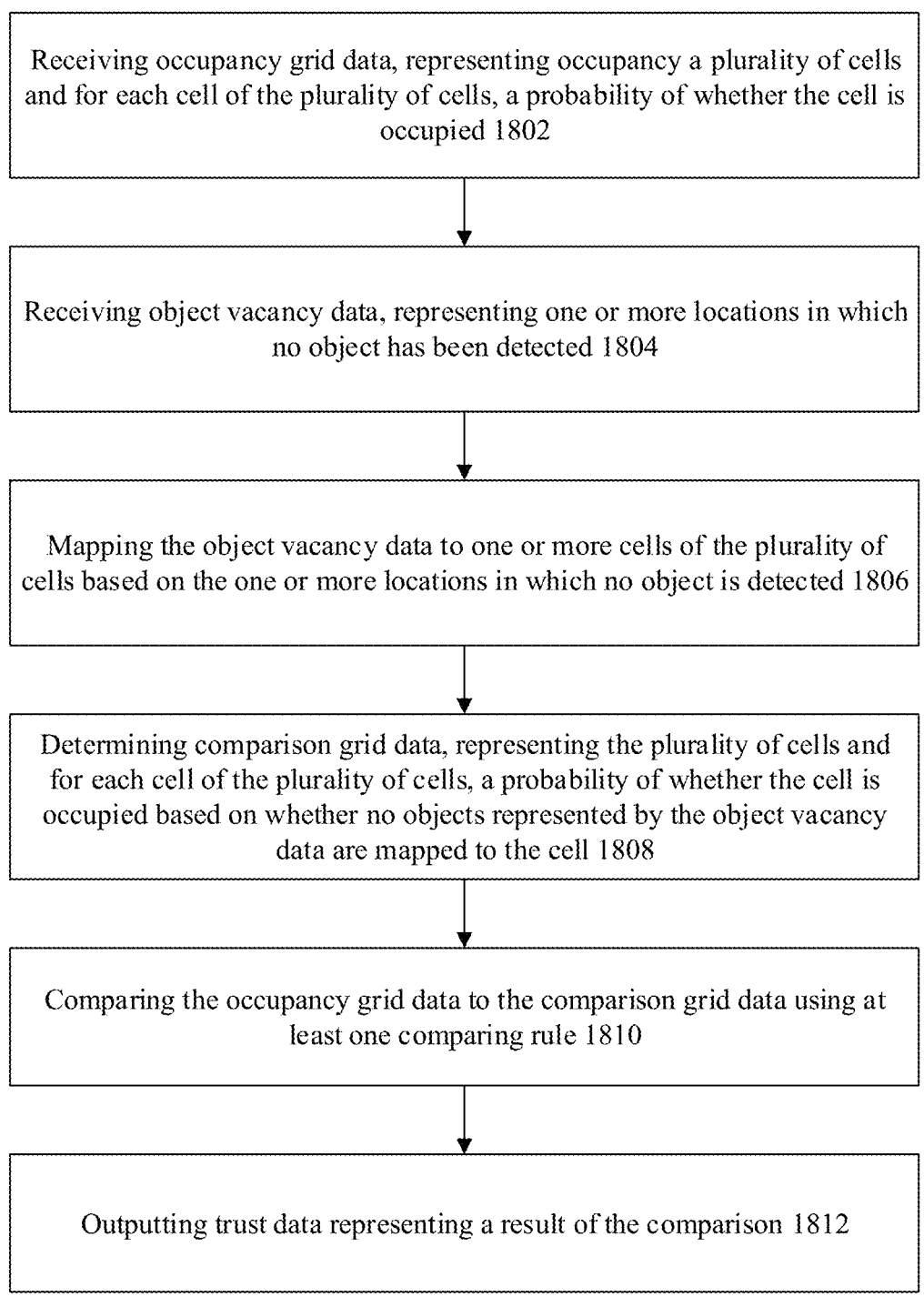
FIG. 18 shows a second method of occupancy verification.

FIG. 18 shows a method of occupancy verification according to another aspect of the disclosure, including receiving occupancy grid data, representing occupancy a plurality of cells and for each cell of the plurality of cells, a probability of whether the cell is occupied 1802; receiving object vacancy data, representing one or more locations in which no object has been detected 1804; mapping the object vacancy data to one or more cells of the plurality of cells based on the one or more locations in which no object is detected 1806; determining comparison grid data, representing the plurality of cells and for each cell of the plurality of cells, a probability of whether the cell is occupied based on whether no objects represented by the object vacancy data are mapped to the cell 1808; comparing the occupancy grid data to the comparison grid data using at least one comparing rule 1810; and outputting trust data representing a result of the comparison 1812.

According to an aspect of the disclosure, the at least one comparing rule may include determining a distance between the occupancy grid data and the comparison grid data in accordance with a predefined distance metric. This predefined distance metric may include or be a Bhattacharyya distance between the occupancy grid data and the comparison grid data. The distance metric may be selected based on the given implementation. According to another aspect the disclosure, the distance metric may include determining an average distance and comparing the average distance to a predetermined range or comparing the average distance to a threshold defined as one or more standard deviations from the average.

If the results of the comparison indicate that a detected object is a false positive, the one or more processors may include a tag as an instruction to deactivate the object. In this manner, the object may be removed from one or more registers, arrays, matrices, vectors, or otherwise. The object may be deleted or ignored, such that it is not incorporated in a driving decision made by the Safety Driving Module.

In the following, various aspects of the present disclosure will be illustrated:

1. In example 1, An occupancy verification device is disclosed, including one or more processors, configured to: receive occupancy grid data, representing a plurality of cells of an occupancy grid and for each cell of the plurality of cells, a probability of whether the cell is occupied; receive object location data, representing one or more locations of one or more objects identified using a model; map the object location data to one or more cells of the plurality of cells based on the one or more locations of the one or more objects; determine comparison grid data, representing the plurality of cells of the occupancy grid and for each cell of the plurality of cells, a probability of whether the cell is occupied based on whether the object location data are mapped to the cell; compare the occupancy grid data to the comparison grid data using at least one comparing rule; and output trust data representing a result of the comparison.

2. In example 2, the occupancy verification device of example 1, wherein the at least one comparing rule includes determining a distance between the occupancy grid data and the comparison grid data in accordance with a pre-defined distance metric.

3. In example 3, the occupancy verification device of example 2, wherein the at least one comparing rule includes determining a Bhattacharyya distance between the occupancy grid data and the comparison grid data.

4. In example 4, the occupancy verification device of any one of examples 1 to 3, wherein the at least one comparing rule includes determining an average distance or one or more standard deviations between the occupancy grid data and the comparison grid data.

5. In example 5, the occupancy verification device of any one of examples 1 to 4, wherein determining the comparison grid data includes determining an occupancy probability of whether the cell is occupied based on whether one or more objects represented by the object location data are mapped to the cell.

6. In example 6, the occupancy verification device of any one of examples 1 to 5, wherein the trust data include a tag representing an instruction to deactivate the object.

7. In example 7, the occupancy verification device of any one of examples 1 to 6, wherein the trust data include an instruction to increase an occupancy probability of one or more cells to which the object location data were mapped.

8. In example 8, the occupancy verification device of any one of examples 1 to 7, wherein the trust data include an instruction to define one or more cells to which the object location data were mapped as being occupied.

9. In example 9, the occupancy verification device of any one of examples 1 to 8, wherein the trust data include an instruction not to consider an object of the one or more objects in a driving decision if a result of the comparison is outside of a predetermined range.

10. In example 10, the occupancy verification device of any one of examples 1 to 9, wherein the locations of the one or more objects are locations relative to an ego vehicle.

11. In example 11, the occupancy verification device of any one of examples 1 to 10, wherein the object location data are provided by an artificial neural network as an implementation of the model.

12. In example 12, the occupancy verification device of any one of examples 1 to 11, wherein the one or more processors receive the object location data from a neural network.

13. In example 13, the occupancy verification device of any one of examples 1 to 12, wherein the occupancy grid data further represent velocities associated with one or more cells of the plurality of cells; and wherein the object location data further represent velocities of the one or more objects; and wherein the one or more processors are further configured to: determine velocity comparison grid data, representing the plurality of cells and for each cell of the plurality of cells to which the object location data was mapped, a velocity of the object; compare the velocities of the occupancy grid data with the velocity comparison grid data based on at least one velocity comparing rule; and output velocity trust data representing a result of the comparison.

14. In example 14, the occupancy verification device of example 13, wherein the at least one velocity comparing rule includes determining a distance between the occupancy grid data and the comparison grid data in accordance with a pre-defined distance metric.

15. In example 15, the occupancy verification device of example 14, wherein the at least one velocity comparing rule includes determining a Bhattacharyya distance between the velocities of the occupancy grid data and the velocity comparison grid data.

16. In example 16, the occupancy verification device of any of examples 13 to 15, wherein the at least one velocity comparing rule includes determining an average distance or one or more standard deviations between the velocities of the occupancy grid data and the velocity comparison grid data.

17. In example 17, the occupancy verification device of any one of examples 13 to 16, wherein the velocity trust data include an instruction to modify a velocity within the object location data.

18. In example 18, the occupancy verification device of any one of examples 13 to 17, wherein the trust data include an instruction to modify a velocity associated with the one or more cells of the plurality of cells to which an object was mapped.

19. In example 19, an occupancy verification device, including one or more processors, configured to: receive occupancy grid data, representing occupancy of a plurality of cells and for each cell of the plurality of cells, a probability of whether the cell is occupied; receive object vacancy data, representing one or more locations in which no object has been detected; map the object vacancy data to one or more cells of the plurality of cells based on the one or more locations in which no object is detected; determine comparison grid data, representing the plurality of cells and for each cell of the plurality of cells, a probability of whether the cell is occupied based on whether no objects represented by the object vacancy data are mapped to the cell; compare the occupancy grid data to the comparison grid data using at least one comparing rule; and output trust data representing a result of the comparison.

20. In example 20, the occupancy verification device of example 19, wherein the at least one comparing rule includes determining a distance between the occupancy grid data and the comparison grid data in accordance with a pre-defined distance metric.

21. In example 21, the occupancy verification device of example 20, wherein the at least one comparing rule includes determining a Bhattacharyya distance between the occupancy grid data and the comparison grid data.

22. In example 22, the occupancy verification device of any one of examples 19 to 21, wherein the at least one comparing rule includes determining an average distance or one or more standard deviations between the occupancy grid data and the comparison grid data.

23. In example 23, the occupancy verification device of any one of examples 19 to 22, wherein determining the comparison grid data includes determining an occupancy probability of whether the cell is occupied based on whether one or more objects represented by the object location data are mapped to the cell.

24. In example 24, the occupancy verification device of any one of examples 19 to 23, wherein the trust data include an instruction to define an object at a location represented by the object vacancy data.

25. In example 25, the occupancy verification device of any one of examples 19 to 24, wherein the trust data include an instruction to decrease an occupancy probability of one or more cells to which the object location data was mapped.

26. In example 26, the occupancy verification device of any one of examples 19 to 25, wherein the trust data include an instruction to define one or more cells to which an object was mapped as being vacant.

27. In example 27, the occupancy verification device of any one of examples 19 to 26, wherein the trust data include an instruction to consider an object of the one or more objects at a location associated with the object vacancy data in a driving decision if a result of the comparison is outside of a predetermined range.

28. In example 28, the occupancy verification device of any one of examples 19 to 27, wherein the object vacancy data are detected by a neural network.

29. In example 29, the occupancy verification device of any one of examples 19 to 28, wherein the one or more processors receive the object vacancy data from a neural network.

30. In example 30, a method of occupancy verification, including receiving occupancy grid data, representing a plurality of cells of an occupancy grid and for each cell of the plurality of cells, a probability of whether the cell is occupied; receiving object location data, representing one or more locations of one or more objects identified using a model; mapping the object location data to one or more cells of the plurality of cells based on the one or more locations of the one or more objects; determining comparison grid data, representing the plurality of cells of the occupancy grid and for each cell of the plurality of cells, a probability of whether the cell is occupied based on whether the object location data are mapped to the cell; comparing the occupancy grid data to the comparison grid data using at least one comparing rule; and outputting trust data representing a result of the comparison.

31. In example 31, the method of occupancy verification of example 30, wherein the at least one comparing rule includes determining a distance between the occupancy grid data and the comparison grid data in accordance with a pre-defined distance metric.

32. In example 32, the method of occupancy verification of example 31, wherein the at least one comparing rule includes determining a Bhattacharyya distance between the occupancy grid data and the comparison grid data.

33. In example 33, the method of occupancy verification of any one of examples 30 to 32, wherein the at least one comparing rule includes determining an average distance or one or more standard deviations between the occupancy grid data and the comparison grid data.

34. In example 34, the method of occupancy verification of any one of examples 30 to 33, wherein determining the comparison grid data includes determining an occupancy probability of whether the cell is occupied based on whether one or more objects represented by the object location data are mapped to the cell.

35. In example 35, the method of occupancy verification of any one of examples 30 to 34, wherein the trust data include a tag representing an instruction to deactivate the object.

36. In example 36, the method of occupancy verification of any one of examples 30 to 35, wherein the trust data include an instruction to increase an occupancy probability of one or more cells to which the object location data were mapped.

37. In example 37, the method of occupancy verification of any one of examples 30 to 36, wherein the trust data include an instruction to define one or more cells to which the object location data were mapped as being occupied.

38. In example 38, the method of occupancy verification of any one of examples 30 to 37, wherein the trust data include an instruction not to consider an object of the one or more objects in a driving decision if a result of the comparison is outside of a predetermined range.

39. In example 39, the method of occupancy verification of any one of examples 30 to 38, wherein the locations of the one or more objects are locations relative to an ego vehicle.

40. In example 40, the method of occupancy verification of any one of examples 30 to 39, wherein the object location data are provided by an artificial neural network as an implementation of the model.

41. In example 41, the method of occupancy verification of any one of examples 30 to 40, wherein the object location data are received from a neural network.

42. In example 42, the method of occupancy verification of any one of examples 30 to 41, wherein the occupancy grid data further represent velocities associated with one or more cells of the plurality of cells; and wherein the object location data further represent velocities of the one or more objects; further including: determining velocity comparison grid data, representing the plurality of cells and for each cell of the plurality of cells to which the object location data was mapped, a velocity of the object; comparing the velocities of the occupancy grid data with the velocity comparison grid data based on at least one velocity comparing rule; and outputting velocity trust data representing a result of the comparison.

43. In example 43, the method of occupancy verification of example 42, wherein the at least one velocity comparing rule includes determining a distance between the occupancy grid data and the comparison grid data in accordance with a pre-defined distance metric.

44. In example 44, the method of occupancy verification of example 43, wherein the at least one velocity comparing rule includes determining a Bhattacharyya distance between the velocities of the occupancy grid data and the velocity comparison grid data.

45. In example 45, the method of occupancy verification of any of examples 42 to 44, wherein the at least one velocity comparing rule includes determining an average distance or one or more standard deviations between the velocities of the occupancy grid data and the velocity comparison grid data.

46. In example 46, the method of occupancy verification of any one of examples 42 to 45, wherein the velocity trust data include an instruction to modify a velocity within the object location data.

47. In example 47, the method of occupancy verification of any one of examples 42 to 46, wherein the trust data include an instruction to modify a velocity associated with the one or more cells of the plurality of cells to which an object was mapped.

48. In example 48, a method of occupancy verification, including receiving occupancy grid data, representing occupancy of a plurality of cells and for each cell of the plurality of cells, a probability of whether the cell is occupied; receiving object vacancy data, representing one or more locations in which no object has been detected; mapping the object vacancy data to one or more cells of the plurality of cells based on the one or more locations in which no object is detected; determining comparison grid data, representing the plurality of cells and for each cell of the plurality of cells, a probability of whether the cell is occupied based on whether no objects represented by the object vacancy data are mapped to the cell; comparing the occupancy grid data to the comparison grid data using at least one comparing rule; and outputting trust data representing a result of the comparison.

49. In example 49, the method of occupancy verification of example 48, wherein the at least one comparing rule includes determining a distance between the occupancy grid data and the comparison grid data in accordance with a pre-defined distance metric.

50. In example 50, the method of occupancy verification of example 49, wherein the at least one comparing rule includes determining a Bhattacharyya distance between the occupancy grid data and the comparison grid data.

51. In example 51, the method of occupancy verification of any one of examples 48 to 50, wherein the at least one comparing rule includes determining an average distance or one or more standard deviations between the occupancy grid data and the comparison grid data.

52. In example 52, the method of occupancy verification of any one of examples 48 to 51, wherein determining the comparison grid data includes determining an occupancy probability of whether the cell is occupied based on whether one or more objects represented by the object location data are mapped to the cell.

53. In example 53, the occupancy verification device of any one of examples 48 to 52, wherein the trust data include an instruction to define an object at a location represented by the object vacancy data.

54. In example 54, the occupancy verification device of any one of examples 48 to 53, wherein the trust data include an instruction to decrease an occupancy probability of one or more cells to which the object location data was mapped.

55. In example 55, the occupancy verification device of any one of examples 48 to 54, wherein the trust data include an instruction to define one or more cells to which an object was mapped as being vacant.

56. In example 56, the occupancy verification device of any one of examples 48 to 55, wherein the trust data include an instruction to consider an object of the one or more objects at a location associated with the object vacancy data in a driving decision if a result of the comparison is outside of a predetermined range.

57. In example 57, the occupancy verification device of any one of examples 48 to 56, wherein the object vacancy data are detected by a neural network.

58. In example 58, the occupancy verification device of any one of examples 48 to 57, wherein the object vacancy data are received from a neural network.

58. In example 59, a non-transitory computer readable medium, including instructions which, if executed, cause one or more processors to perform any of the methods of examples 30 to 58.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The invention claimed is:

1. An occupancy grid data verification device, comprising: an artificial neural network, configured to receive sensor data and to output object location data using the sensor data, wherein the object location data represent one or more locations of one or more objects as determined by the artificial neural network; one or more processors, configured to:
receive occupancy grid data, representing a plurality of cells of an occupancy grid for an autonomous driving system and for each cell of the plurality of cells, receive data representing a probability of whether the cell is occupied;
map the object location data to one or more cells of the plurality of cells of the occupancy grid based on the one or more locations of the one or more objects;
determine comparison grid data, wherein determining the comparison grid data comprises determining an occupancy status for each cell of the plurality of cells based on whether the object location data are mapped to the cell;
compare the occupancy grid data to the comparison grid data using at least one comparing rule;
output trust data representing a result of the comparison; wherein the occupancy grid data further represent velocities associated with one or more cells of the plurality of cells; and wherein the object location data further represent velocities of the one or more objects; and wherein the one or more processors are further configured to:
determine velocity comparison grid data, wherein determining the velocity comparison grid data comprises determining a velocity associated with each cell of the plurality of cells based on a velocity of an object from the object location data that is mapped to the cell;
compare the velocities of the occupancy grid data with the velocity comparison grid data based on at least one velocity comparing rule; and
output velocity trust data representing a result of the comparison.

2. The occupancy verification device of claim 1, wherein the at least one comparing rule comprises determining a distance between the occupancy grid data and the comparison grid data in accordance with a pre-defined distance metric.

3. The occupancy verification device of claim 2, wherein the at least one comparing rule comprises determining a Bhattacharyya distance between the occupancy grid data and the comparison grid data.

4. The occupancy verification device of claim 1, wherein determining the comparison grid data comprises determining the occupancy status as occupied if one or more objects represented by the object location data are mapped to the cell and determining the occupancy status as non-occupied if none of the one or more objects represented by the object location data are mapped to the cell.

5. The occupancy verification device of claim 1, wherein the trust data comprise a tag representing an instruction to deactivate the object, an instruction to increase an occupancy probability of one or more cells to which the object location data were mapped, an instruction to define one or more cells to which the object location data were mapped as being occupied, or an instruction not to consider an object of the one or more objects in a driving decision if a result of the comparison is outside of a predetermined range.

6. The occupancy verification device of claim 1, wherein the locations of the one or more objects are locations relative to an ego vehicle.

7. The occupancy verification device of claim 1, wherein the one or more processors receive the object location data from a neural network.

8. The occupancy verification device of claim 1, wherein the at least one velocity comparing rule comprises determining a Bhattacharyya distance between the velocities of the occupancy grid data and the velocity comparison grid data.

9. A non-transitory computer readable medium, comprising instructions which, if executed, cause one or more processors to:
receive occupancy grid data, representing a plurality of cells of an occupancy grid for an autonomous driving system and for each cell of the plurality of cells, receive data representing a probability of whether the cell is occupied;
implement an artificial neural network to generate object location data based on sensor data, wherein the object location data represent one or more locations of one or more objects identified using a model;
map the object location data to one or more cells of the plurality of cells of the occupancy grid based on the one or more locations of the one or more objects;
determine comparison grid data, wherein determining the comparison grid data comprises determining an occupancy status for each cell of the plurality of cells based on whether the object location data are mapped to the cell;
compare the occupancy grid data to the comparison grid data using at least one comparing rule; and
output trust data representing a result of the comparison; wherein the occupancy grid data further represent velocities associated with one or more cells of the plurality of cells; and wherein the object location data further represent velocities of the one or more objects; further comprising:
determining velocity comparison grid data, wherein determining the velocity
comparison grid data comprises determining a velocity associated with each cell of the plurality of cells based on a velocity of an object from the object location data that is mapped to the cell;
comparing the velocities of the occupancy grid data with the velocity comparison grid data based on at least one velocity comparing rule; and
outputting velocity trust data representing a result of the comparison.

10. The non-transitory computer readable medium of claim 9, wherein the at least one comparing rule comprises determining a Bhattacharyya distance between the occupancy grid data and the comparison grid data.

11. The non-transitory computer readable medium of claim 9, wherein the trust data comprise a tag representing an instruction to deactivate the object, an instruction to increase an occupancy probability of one or more cells to which the object location data were mapped, an instruction to define one or more cells to which the object location data were mapped as being occupied, or an instruction not to consider an object of the one or more objects in a driving decision if a result of the comparison is outside of a predetermined range.

12. The occupancy grid data verification device of claim 1, wherein at least one cell of the plurality of cells comprises a stored velocity value for an object corresponding to the cell; and wherein the processor being configured to determine the velocity comparison grid data comprises receiving a velocity value associated with an object detected by the artificial neural network and comparing this velocity value with the stored velocity value in a corresponding cell of the occupancy grid.

13. The occupancy grid data verification device of claim 1 wherein the processor receiving data representing a probability of whether the cell is occupied comprises the processor receiving data about whether the cell is currently occupied.

\* \* \* \* \*